US012800795B2

(12) United States Patent
Kuzuhara et al.

(10) Patent No.: US 12,800,795 B2
(45) Date of Patent: Nov. 17, 2026

(54) ANTI-GLARE FILM, AND POLARIZING PLATE, SURFACE PLATE, IMAGE DISPLAY PANEL, AND IMAGE DISPLAY DEVICE THAT USE SAME

(71) Applicant: DAI NIPPON PRINTING CO., LTD., Tokyo (JP)

(72) Inventors: Mitsuhiro Kuzuhara, Okayama (JP); Yukimitsu Iwata, Okayama (JP); Jun Tsujimoto, Bizen (JP); Gen Furui, Okayama (JP); Makio Kurashige, Yokohama (JP); Kazutoshi Ishida, Saitama (JP); Shumpei Nishio, Nagareyama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 199 days.

(21) Appl. No.: 18/702,205

(22) PCT Filed: Oct. 27, 2022

(86) PCT No.: PCT/JP2022/040073
§ 371 (c)(1),
(2) Date: Apr. 17, 2024

(87) PCT Pub. No.: WO2023/074779
PCT Pub. Date: May 4, 2023

(65) Prior Publication Data

US 2025/0237790 A1 Jul. 24, 2025

(30) Foreign Application Priority Data

Oct. 28, 2021 (JP) ................................ 2021-176739
Apr. 25, 2022 (JP) ................................ 2022-071718

(51) Int. Cl.
*G02B 1/11* (2015.01)

(52) U.S. Cl.
CPC .................................... *G02B 1/11* (2013.01)

(58) Field of Classification Search
CPC ........... G02B 1/11; G02B 1/111; G02B 1/113; G02B 1/115; G02B 1/14; G02B 5/02;
(Continued)

(56) References Cited

U.S. PATENT DOCUMENTS 6,164,785 A 12/2000 Maekawa
6,977,696 B2 * 12/2005 Amimori .......... G02F 1/133504 359/489.03
(Continued)

FOREIGN PATENT DOCUMENTS

EP 3438708 A1 2/2019
JP H1020103 A 1/1998
(Continued)

OTHER PUBLICATIONS

International Search Report issued for International Patent Application No. PCT/JP2022/040073, Date of mailing: Dec. 27, 2022, 7 pages including English translation.
(Continued)

*Primary Examiner* — Jie Lei
(74) *Attorney, Agent, or Firm* — HSML P.C.

(57) ABSTRACT

Provided is an anti-glare film excellence in anti-glare properties and capable of suppressing sparkle. An anti-glare film including an anti-glare layer, the anti-glare film having an uneven surface, wherein a 60°-specular glossiness measured from the uneven surface side is 30.0 or less, and a coefficient of variation of brightness is 0.0400 or less. The anti-glare film has a 20°-specular glossiness measured from the uneven surface side of preferably 6.0 or less.

20 Claims, 2 Drawing Sheets

(58) Field of Classification Search
CPC .. G02B 5/0226; G02B 5/0242; G02B 5/0278; G02B 5/0294; G02B 5/0268; G02B 5/0221; G02B 5/0231; G02B 5/30; G02F 1/1335; G02F 1/133502; G09F 9/00; H10K 59/8791; H10K 59/10; H10K 50/86; H05B 33/02; H05B 33/14; B32B 7/02; B32B 7/023
USPC ....... 359/601, 603, 609, 606, 580, 615, 707, 359/586, 599
See application file for complete search history.

(56) References Cited

U.S. PATENT DOCUMENTS

| | | | |
|---|---|---|---|
| 2008/0286527 A1 | 11/2008 | Haga et al. | |
| 2009/0015926 A1 | 1/2009 | Iwata et al. | |
| 2009/0268299 A1 | 10/2009 | Furui et al. | |
| 2010/0027124 A1 | 2/2010 | Nagahama et al. | |
| 2010/0053756 A1* | 3/2010 | Asakura ............... | G02B 5/0278 359/601 |
| 2018/0095197 A1 | 4/2018 | Dillon | |
| 2020/0110197 A1 | 4/2020 | Sugawara et al. | |
| 2020/0158922 A1 | 5/2020 | Hayashi et al. | |
| 2020/0166677 A1 | 5/2020 | Sugawara | |
| 2020/0166678 A1 | 5/2020 | Sugawara et al. | |
| 2021/0388210 A1 | 12/2021 | Fan et al. | |
| 2021/0388211 A1 | 12/2021 | Fan et al. | |
| 2022/0229208 A1 | 7/2022 | Sato et al. | |
| 2023/0086813 A1 | 3/2023 | Ying et al. | |
| 2023/0092571 A1 | 3/2023 | Ying et al. | |
| 2023/0229036 A1 | 7/2023 | Kuzuhara et al. | |

FOREIGN PATENT DOCUMENTS

| | | | |
|---|---|---|---|
| JP | 20010033625 | A | 2/2001 |
| JP | 2008203836 | A | 9/2008 |
| JP | 2008233870 | A | 10/2008 |
| JP | 2010160398 | A | 7/2010 |
| JP | 2015172641 | A | 10/2015 |
| JP | 2015172832 | A | 10/2015 |
| JP | 2015172834 | A | 10/2015 |
| JP | 2017187760 | A | 10/2017 |
| JP | 2018185769 | A | 11/2018 |
| JP | 2019066842 | A | 4/2019 |
| JP | 2021054047 | A | 4/2021 |
| JP | 2021182135 | A | 11/2021 |
| JP | 2021182136 | A | 11/2021 |
| JP | 2021182137 | A | 11/2021 |
| JP | 2022025624 | A | 2/2022 |
| JP | 2023044608 | A | 3/2023 |
| JP | 2023044609 | A | 3/2023 |
| WO | 2008020587 | A1 | 2/2008 |
| WO | 2008140108 | A1 | 11/2008 |
| WO | 2012164843 | A1 | 12/2012 |
| WO | 2019026466 | A1 | 2/2019 |
| WO | 2019026468 | A1 | 2/2019 |
| WO | 2019026470 | A1 | 2/2019 |
| WO | 2019026471 | A1 | 2/2019 |
| WO | 2019065865 | A1 | 4/2019 |
| WO | 2020246314 | A1 | 12/2020 |
| WO | 2021230337 | A1 | 11/2021 |

OTHER PUBLICATIONS

Written Opinion issued for International Patent Application No. PCT/JP2022/040073, Date of mailing: Dec. 27, 2022, 14 pages including English translation.
Notice of Reasons for Refusal issued for Japanese Patent Application No. 2022-071718, Dispatch Date: May 31, 2022, 27 pages including English machine translation.
Decision of Refusal issued for Japanese Patent Application No. 2022-071718, Dispatch Date: Aug. 30, 2022, 10 pages including English machine translation.
Notice of Reasons for Refusal issued for Japanese Patent Application No. 2023-543277, Dispatch Date: Aug. 8, 2023, 16 pages including English machine translation.
Notice of Reasons for Refusal issued for Japanese Patent Application No. 2023-543277, Dispatch Date: Sep. 19, 2023, 6 pages including English machine translation.
Decision of Refusal issued for Japanese Patent Application No. 2023-543277, Dispatch Date: Oct. 31, 2023, 11 pages including English machine translation.
Request for the Submission of an Opinion issued for Korean Patent Application No. 10-2024-7013636, Dispatched date: Jun. 8, 2026, 22 pages including English machine translation.

* cited by examiner

[Fig. 1]
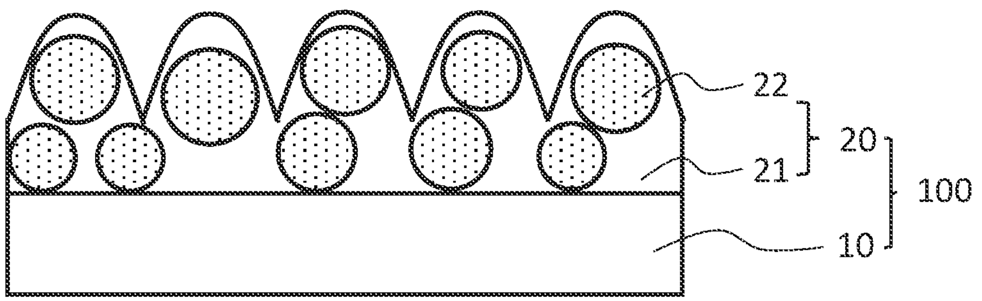
[Fig. 2]
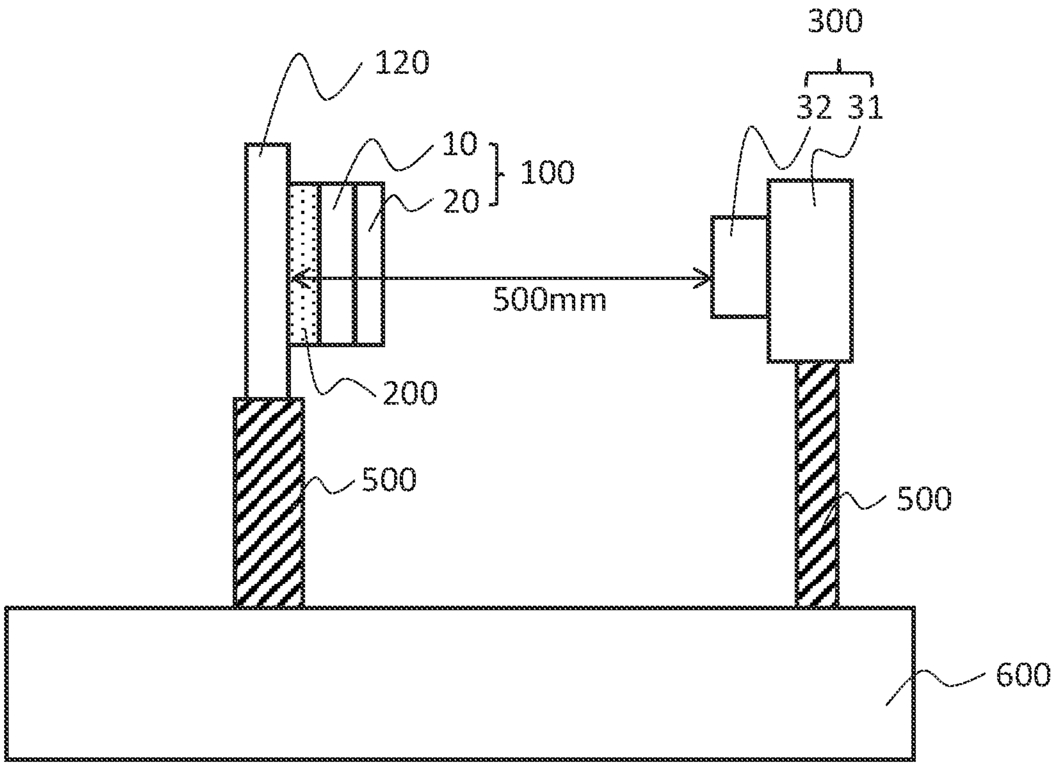

[Fig. 3]
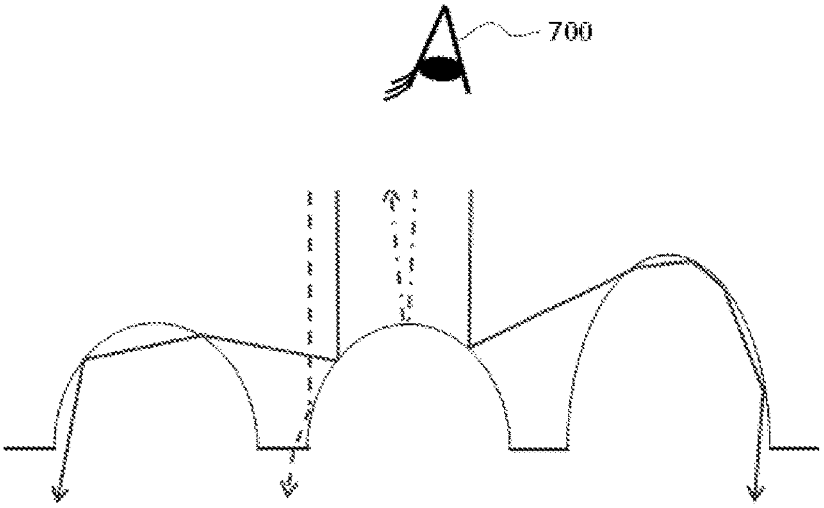
[Fig. 4]
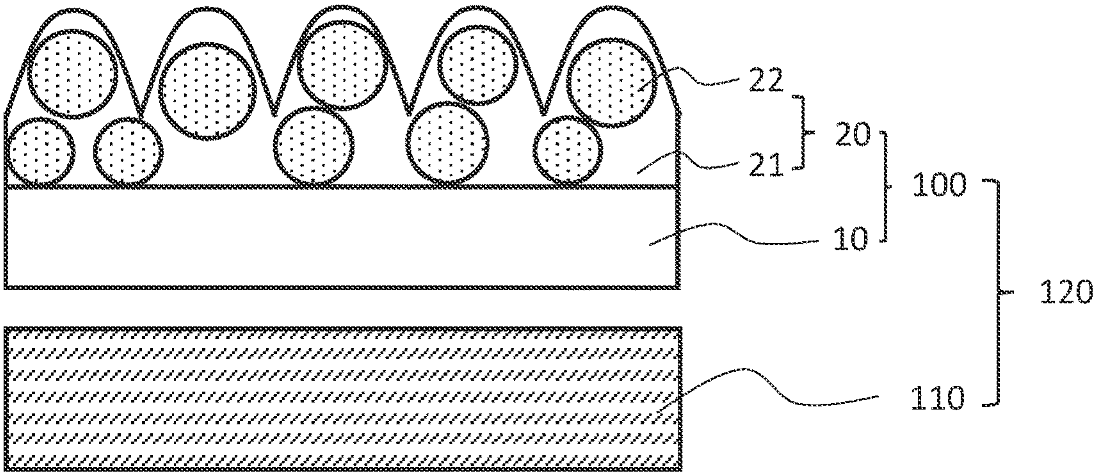

ANTI-GLARE FILM, AND POLARIZING PLATE, SURFACE PLATE, IMAGE DISPLAY PANEL, AND IMAGE DISPLAY DEVICE THAT USE SAME

TECHNICAL FIELD

The present disclosure relates to an anti-glare film, and a polarizing plate, a surface plate, an image display panel, and an image display device that use the same.

BACKGROUND ART

An anti-glare film in order to impart anti-glare properties may be installed on the surface of an image display device such as a monitor of a TV, a laptop PC, or a desktop PC. The anti-glare properties refer to properties to suppress reflection of a background such as illumination or a person.

The anti-glare film has a basic structure in which an anti-glare layer having an unevenly shaped surface is provided on a transparent substrate. The anti-glare film has a problem of causing sparkle caused by the uneven shape on the surface. The sparkle is a phenomenon in which minute variations in brightness are visible in video light.

Accordingly, anti-glare films in which imparting the anti-glare properties and suppressing the sparkle are both achieved have been proposed (for example, PTL 1 to 3).

CITATION LIST

Patent Literature

PTL 1: JP 2015-172641 A
PTL 2: JP 2015-172832 A
PTL 3: JP 2015-172834 A

SUMMARY OF INVENTION

Technical Problem

However, conventional anti-glare films such as those described in PTL 1 to 3 impart anti-glare properties to such an extent that an outline of a background such as illumination or a person is blurred, and therefore it has been difficult to sufficiently suppress reflection of a background.

On the other hand, by increasing the degree of roughness of the surface unevenness of the anti-glare layer, reflection of a background is sufficiently suppressed and the anti-glare properties can be improved. However, simply increasing the degree of roughness of the surface unevenness results in a problem of deteriorating the sparkle.

An object of the present disclosure is to provide an anti-glare film excellence in anti-glare properties and capable of suppressing the sparkle.

Solution to Problem

The present disclosure provides an anti-glare film according to the following <1> to <5>, and a polarizing plate, a surface plate, an image display panel, and a display device that use the same:

<1> An anti-glare film comprising an anti-glare layer, the anti-glare film having an uneven surface, wherein a 60°-specular glossiness measured from the uneven surface side is 30.0 or less, and a coefficient of variation of brightness is 0.0400 or less, (measurement of the coefficient of variation of brightness) the anti-glare film is laminated with a surface opposite to the uneven surface of the anti-glare film onto an image display device having a display element having a pixel density of 424 ppi; an image of the image display device is displayed in green in a dark room, and the image is photographed with a CCD camera from the anti-glare film side to obtain an image data, wherein the CCD camera used has a pixel pitch of 5.5 μm×5.5 μm and the number of pixels of 16 million pixels, and a distance from a surface of the display element to an incident pupil of a camera lens contained in the CCD camera is 500 mm; from the obtained image data, a region α with 128×128 pixels is extracted; the region α is subdivided into regions each with 8×8 pixels to obtain 256 small regions; in each of the small regions, brightness of each pixel in each of the small regions is divided by an average brightness of all pixels in each of the small regions to obtain a corrected brightness; and a standard deviation of the corrected brightness in the 256 small regions is divided by an average value of the corrected brightness in the 256 small regions to calculate a coefficient of variation of the brightness.

<2> A polarizing plate comprising:
- a polarizer;
- a first transparent protective plate disposed on one side of the polarizer; and
- a second transparent protective plate disposed on the other side of the polarizer, wherein
- at least one of the first transparent protective plate and the second transparent protective plate is the anti-glare film according to <1>, and
- a surface opposite to the uneven surface of the anti-glare film and the polarizer are disposed so as to face each other.

<3> A surface plate for an image display device, the surface plate comprising:
- a resin plate or a glass plate; and
- a protective film bonded to the resin plate or the glass plate, wherein
- the protective film is the anti-glare film according to <1>, and
- a surface opposite to the uneven surface of the anti-glare film and the resin plate or the glass plate are disposed so as to face each other.

<4> An image display panel comprising:
- a display element; and
- an optical film disposed on a light-emitting surface side of the display element, wherein
- the image display panel comprises the anti-glare film according to <1> as the optical film, and
- the anti-glare film is disposed so that a surface of the anti-glare film on the uneven surface side is disposed so as to face the opposite side to the display element.

<5> An image display device comprising the image display panel according to <4>, wherein the anti-glare film is disposed on an outermost surface.

Advantageous Effects of Invention

The anti-glare film of the present disclosure and the polarizing plate, the surface plate, the image display panel, and the image display device that use the same are excellent in anti-glare properties, and capable of suppressing the sparkle.

BRIEF DESCRIPTION OF DRAWINGS

FIG. 1 is a schematic cross-sectional view showing one embodiment of an anti-glare film of the present disclosure.

FIG. 2 is a schematic view for explaining an embodiment of a disposition relationship of an image display device, an anti-glare film, and a CCD camera in measuring a coefficient of variation of brightness FIG. 3 is a schematic view for explaining the behavior of light incident on an anti-glare film from a side of an uneven surface of the anti-glare film.

FIG. 4 is a cross-sectional view showing one embodiment of an image display panel of the present disclosure.

DESCRIPTION OF EMBODIMENTS

Embodiments of the present disclosure will be described below.

[Anti-Glare Film]

An anti-glare film of the present disclosure is an anti-glare film comprising an anti-glare layer, the anti-glare film having an uneven surface, wherein a 60°-specular glossiness measured from the uneven surface side is 30.0 or less, and a coefficient of variation of brightness is 0.0400 or less, (Measurement of the Coefficient of Variation of Brightness)

the anti-glare film is laminated with a surface opposite to the uneven surface of the anti-glare film onto an image display device having a display element having a pixel density of 424 ppi; an image of the image display device is displayed in green in a dark room, and the image is photographed with a CCD camera from the anti-glare film side to obtain an image data, wherein the CCD camera used has a pixel pitch of 5.5 μm×5.5 μm and the number of pixels of 16 million pixels, and a distance from a surface of the display element to an incident pupil of a camera lens contained in the CCD camera is 500 mm; from the obtained image data, a region α with 128×128 pixels is extracted; the region α is subdivided into regions each with 8×8 pixels to obtain 256 small regions; in each of the small regions, brightness of each pixel in each of the small regions is divided by an average brightness of all pixels in each of the small regions to obtain a corrected brightness; and a standard deviation of the corrected brightness in the 256 small regions is divided by an average value of the corrected brightness in the 256 small regions to calculate a coefficient of variation of the brightness.

FIG. 1 is a schematic cross-sectional view of the cross-sectional shape of an anti-glare film 100 of the present disclosure.

The anti-glare film 100 of FIG. 1 has an anti-glare layer 20 and has an uneven surface. In FIG. 1, a surface of the anti-glare layer 20 is the uneven surface of the anti-glare film. The anti-glare film 100 of FIG. 1 has the anti-glare layer 20 on a transparent substrate 10. The anti-glare layer 20 in FIG. 1 has a binder resin 21 and particles 22.

FIG. 1 is a schematic cross-sectional view. That is, the scale of each layer constituting the anti-glare film 100, the scale of each material, and the scale of the surface unevenness are schematic for easy illustration, and are different from the actual scale. The same applies to FIGS. 2 to 4.

The anti-glare film of the present disclosure is not limited to the laminated structure shown in FIG. 1. For example, the anti-glare film may have a single-layer structure of an anti-glare layer, or may have a layer other than the transparent substrate and the anti-glare layer. Examples of the layers other than the transparent substrate and the anti-glare layer include an anti-reflection layer and an anti-fouling layer. When another layer is provided on the anti-glare layer, a surface of the other layer may be the uneven surface of the anti-glare film.

A preferred embodiment of the anti-glare film includes an anti-glare layer on a transparent substrate, wherein a surface of the anti-glare layer opposite to the transparent substrate is the uneven surface of the anti-glare film.

<Transparent Substrate>

The anti-glare film preferably has a transparent substrate in order to improve ease of production of the anti-glare film and ease of handling of the anti-glare film.

The transparent substrate preferably has light transmittance, smoothness, heat resistance, and excellent mechanical strength. Examples of such a transparent substrate include plastic films such as polyester, triacetyl cellulose (TAC), cellulose diacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, polyurethane, and amorphous olefin (Cyclo-Olefin-Polymer: COP). The transparent substrate may be a laminate of two or more plastic films.

Among these, in order to improve the mechanical strength and the dimensional stability, polyester, such as polyethylene terephthalate and polyethylene naphthalate, subjected to a stretching process, specifically a biaxial stretching process, is preferable. TAC and acryl are preferable because of good light transmittance and optical isotropy. COP and polyester are preferable in terms of excellent weather resistance.

The thickness of the transparent substrate is preferably 5 μm or more and 300 μm or less, more preferably 20 μm or more and 200 μm or less, and still more preferably 30 μm or more and 120 μm or less.

When it is desired to reduce the thickness of the anti-glare film, the upper limit of the thickness of the transparent substrate is preferably 60 μm or less, and more preferably 50 μm or less. When the transparent substrate is a low moisture-permeable substrate such as polyester, COP, or acrylic, the upper limit of the thickness of the transparent substrate for forming a thin film is preferably 40 μm or less, and more preferably 20 μm or less. Even in the case of a large screen, when the upper limit of the thickness of the transparent substrate is within the aforementioned range, strain of the anti-glare film is less likely to occur, which is preferable.

The thickness of the transparent substrate can be measured with Digimatic standard outside micrometer (product number "MDC-25SX" available from MITUTOYO CORPORATION) or the like. As the thickness of the transparent substrate, the average of the values measured at any ten points thereof may be the value described above.

Examples of the preferred range of the thickness of the transparent substrate include 5 μm or more and 300 μm or less, 5 μm or more and 200 μm or less, 5 μm or more and 120 μm or less, 5 μm or more and 60 μm or less, 5 μm or more and 50 μm or less, 5 μm or more and 40 μm or less, 5 μm or more and 20 μm or less, 20 μm or more and 300 μm or less, 20 μm or more and 200 μm or less, 20 μm or more and 120 μm or less, 20 μm or more and 60 μm or less, 20 μm or more and 50 μm or less, 20 μm or more and 40 μm or less, 30 μm or more and 300 μm or less, 30 μm or more and 200 μm or less, 30 μm or more and 120 μm or less, 30 μm or more and 60 μm or less, 30 μm or more and 50 μm or less, and 30 μm or more and 40 μm or less.

A surface of the transparent substrate may be subjected to a physical treatment such as a corona discharge treatment or a chemical treatment, or an easily adhesive layer may be formed on the surface of the transparent substrate to improve adhesiveness.

The substrate preferably has a total light transmittance in accordance with JIS K7361-1:1997 of 70% or more, more preferably 80% or more, and further preferably 85% or more.

The substrate preferably has a haze in accordance with JIS K7136:2000 of 10% or less, more preferably 5% or less, and further preferably 3% or less.

<Uneven Surface>

The anti-glare film of the present disclosure has an uneven surface. When there is no other layer on the anti-glare layer, a surface of the anti-glare layer is the uneven surface of the anti-glare film. When another layer is provided on the anti-glare layer, a surface of the other layer is the uneven surface.

<60°-Specular Glossiness and Coefficient of Variation of Brightness>

The anti-glare film of the present disclosure is required to have a 60°-specular glossiness measured from the uneven surface side of 30.0 or less, and a coefficient of variation of brightness of 0.0400 or less.

When the 60°-specular glossiness of the anti-glare film is more than 30.0, reflection of a background cannot be sufficiently suppressed, and the anti-glare properties cannot be improved.

The 60°-specular glossiness of the anti-glare film is preferably 20.0 or less, more preferably 10.0 or less, and further preferably 7.0 or less.

When the 60°-specular glossiness of the anti-glare film is too low, video light tends to be scattered when transmitting the anti-glare film, and dark-room contrast tends to decrease. Therefore, the 60°-specular glossiness of the anti-glare film is preferably 0.5 or more, more preferably 1.0 or more, and further preferably 1.2 or more.

When a plurality of options of an upper limit value and a plurality of options of a lower limit value are described in the present specification, one selected from the options of the upper limit and one selected from the options of the lower limit can be combined to form an embodiment of a numerical range. Examples of embodiments of the 60°-specular glossiness include numerical ranges of 0.5 or more and 30.0 or less, 0.5 or more and 20.0 or less, 0.5 or more and 10.0 or less, 0.5 or more and 7.0 or less, 1.0 or more and 30.0 or less, 1.0 or more and 20.0 or less, 1.0 or more and 10.0 or less, 1.0 or more and 7.0 or less, 1.2 or more and 30.0 or less, 1.2 or more and 20.0 or less, 1.2 or more and 10.0 or less, and 1.2 or more and 7.0 or less.

In the present specification, the 60°-specular glossiness and the 20°-specular glossiness mean specular glossiness defined in JIS Z8741:1997.

In the present specification, the 60°-specular glossiness and the 20°-specular glossiness are measured by laminating a black plate on a side opposite to the uneven surface of the anti-glare film via a transparent self-adhesive layer to produce a sample, and measuring the specular glossiness from the uneven surface side of the sample.

A difference in refractive indices between a layer contacted with the transparent self-adhesive layer of the sample and the transparent self-adhesive layer is preferably within 0.15, more preferably within 0.10, more preferably within 0.05, and more preferably within 0.01. Examples of the layer contacted with the transparent self-adhesive layer of the sample include a transparent substrate or the anti-glare layer. The black plate has a total light transmittance in accordance with JIS K7361-1:1997 of preferably 1% or less, and more preferably 0%. A difference between a refractive index of a resin constituting the black plate and the refractive index of the transparent self-adhesive layer is preferably within 0.15, more preferably within 0.10, more preferably within 0.05, and more preferably within 0.01.

When the coefficient of variation of the brightness of the anti-glare film is more than 0.0400, the sparkle cannot be suppressed.

The coefficient of variation of the brightness of the anti-glare film is preferably 0.0350 or less, more preferably 0.0280 or less, and further preferably 0.0250 or less.

When the coefficient of variation of the brightness of the anti-glare film is too small, the anti-glare properties of the anti-glare film may be excessively low, or in contrast, the anti-glare properties of the anti-glare film may be excessively high to deteriorate the contrast.

Thus, a lower limit of the coefficient of variation of the brightness of the anti-glare film is preferably 0.0050 or more, and more preferably 0.0100 or more.

Examples of a preferable range of the coefficient of variation of the brightness of the anti-glare film include 0.0050 or more and 0.0400 or less, 0.0050 or more and 0.0350 or less, 0.0050 or more and 0.0280 or less, 0.0050 or more and 0.0250 or less, 0.0100 or more and 0.0400 or less, 0.0100 or more and 0.0350 or less, 0.0100 or more and 0.0280 or less, and 0.0100 or more and 0.0250 or less.

The coefficient of variation of the brightness of the anti-glare film is calculated by the following measurement.

(Measurement of Coefficient of Variation of Brightness)

The anti-glare film is laminated with a surface opposite to the uneven surface of the anti-glare film onto an image display device having a display element having a pixel density of 424 ppi. An image of the image display device is displayed in green in a dark room, and the image is photographed with a CCD camera from the anti-glare film side to obtain an image data. The CCD camera used has a pixel pitch of 5.5 μm×5.5 μm and the number of pixels of 16 million pixels. A distance from a surface of the display element to an incident pupil of a camera lens contained in the CCD camera is 500 mm. From the obtained image data, a region α with 128×128 pixels is extracted. The region α is subdivided into regions each with 8×8 pixels to obtain 256 small regions. In each of the small regions, brightness of each pixel in each of the small regions is divided by an average brightness of all pixels in each of the small regions to obtain a corrected brightness. A standard deviation of the corrected brightness in the 256 small regions is divided by an average value of the corrected brightness in the 256 small regions to calculate a coefficient of variation of the brightness.

FIG. 2 is a schematic view for explaining an embodiment of a disposition relationship of an image display device 120, an anti-glare film 100, and a CCD camera 300 in measuring the coefficient of variation of the brightness.

In FIG. 2, the anti-glare film is laminated with a surface opposite to the uneven surface of the anti-glare film onto the image display device 120. In FIG. 2, the surface of a side of a transparent substrate 10 of the anti-glare film corresponds to the surface of the side opposite to the uneven surface of the anti-glare film. The image display device 120 and the anti-glare film 100 are preferably laminated via a transparent adhesive medium 200, as illustrated in FIG. 2. Examples of a layer constitution of the transparent adhesive medium include: a single layer of the transparent adhesive layer; and a laminated structure of the transparent adhesive layer, the transparent substrate, and the transparent adhesive layer. Examples of the transparent adhesive layer include a transparent self-adhesive layer (in other words, a transparent pressure-sensitive adhesive layer), and a transparent adsorption layer.

A difference in refractive indices between the layer contacted with the transparent adhesive medium of the anti-glare film and an interface with the transparent adhesive medium is preferably within 0.15, more preferably within 0.10, more preferably within 0.05, and more preferably within 0.01. Examples of the layer contacted with the transparent adhesive medium of the anti-glare film include the transparent substrate or the anti-glare layer. A difference in refractive indices on an interface between the transparent adhesive medium and a surface material of the image display device is preferably within 0.15, more preferably within 0.10, more preferably within 0.05, and more preferably within 0.01. Examples of the surface material of the image display device include a cover glass. When a transparent adhesive medium 200 has a laminated structure of two or more layers, there is an interface other than the aforementioned interface between the layer contacted with the transparent adhesive medium of the anti-glare film and the surface material of the image display device. In this case, a difference in refractive indices on the interface other than the aforementioned interface is also preferably within 0.15, more preferably within 0.10, more preferably within 0.05, and more preferably within 0.01.

Examples of the image display device having the display element having a pixel density of 424 ppi include trade name "Xperia (Registered trademark) Z5 E6653" available from Sony Corporation. The image display device having the display element having a pixel density of 424 ppi is preferably an image display device having an RGB-stripe-type liquid crystal display element.

In FIG. 2, a camera in which a camera lens 32 is attached to a camera body 31 is used as the CCD camera 300. Examples of such a CCD camera include a camera in which a camera lens (trade name of NIKON CORPORATION "AI AF Micro-Nikkor 60 mm f/2.8D") is attached to a camera body (a cooling CCD camera [trade name of BITRAN CORPORATION "BU-63M", pixel pitch: 5.5 μm×5.5 μm, number of pixels: 16 million pixels, pixel number: 4896×3264]).

The image is photographed under a dark-room environment with the image display device with display in green. When the image is photographed, a distance from a surface of the display element to an incident pupil of the camera lens contained in the CCD camera is 500 mm. When the image is photographed, the CCD camera is adjusted so as to focus on the surface of the display element. An effective F-value of the CCD camera is preferably set to 36.4.

In the present specification, "display in green" means display in a maximum monotone ((R,G,B)=(0,255,0)) among primary colors to constitute the image element.

From the obtained image data, the region α with 128×128 pixels is extracted. The region α is subdivided into regions each with 8×8 pixels to obtain 256 small regions. In each of the small regions, brightness of each pixel in each of the small regions is divided by an average brightness of all pixels in each of the small regions to obtain the corrected brightness. The standard deviation of the corrected brightness in the 256 small regions is divided by an average value of the corrected brightness in the 256 small regions to calculate the coefficient of variation of the brightness.

A position where the region α is extracted from the 4896×3264 pixels is not particularly limited, but each 10% of top, bottom, left, and right of the 4896×3264 pixels is preferably excluded to extract the region α from the remained 80%.

In the method for measuring the coefficient of variation of the brightness of the present disclosure, since the brightness of each pixel in each small region is divided by the average brightness of all the pixels in each small region as noted above, brightness unevenness specific to the display element can be corrected. In the method for measuring the coefficient of variation of the brightness of the present disclosure, since the standard deviation of the corrected brightness is divided by the average value of the corrected brightness, the absolute value of the brightness specific to the display element does not affect the results. Note that the coefficient of variation of the brightness of the present disclosure is a dimensionless value.

To easily regulate the 60°-specular glossiness and the coefficient of variation of the brightness within the above ranges, Δq and λq, described later, are preferably regulated within ranges described later.

In the present specification, the 60°-specular glossiness and the coefficient of variation of the brightness, and a 20°-specular glossiness, Δq, λq, a haze, and a total light transmittance, which will be described later, mean the average values of the measurement values at sixteen points.

In the present specification, regarding the sixteen measurement points, it is preferable that 1 cm region from the outer edge of a measurement sample is left as a margin, lines that divide the region into five equal parts in the vertical direction and the horizontal direction are drawn in a region on the inner side of the margin, and measurement is performed mainly at sixteen points of the intersection points. For example, in the case of a quadrangular measurement sample, 1 cm region from the outer edge of the quadrangle is left as a margin, and measurement is performed mainly at sixteen points of the intersection points of dotted lines that divide a region on the inner side of the margin into five equal parts in the vertical direction and the horizontal direction. In addition, the average value of the measurement values is preferably regarded as the parameter. When the measurement sample has a shape other than a quadrangle such as a circle, an ellipse, a triangle, or a pentagon, it is preferable to draw a quadrangle inscribed inside these shapes and measurement is performed at each of the sixteen points of the quadrangle according to the above method. The aforementioned quadrangle is preferably a rectangle.

In a case of the coefficient of variation of the brightness, the coefficient of variation of the brightness is calculated at each position. Then, the average value of the coefficient of variations of the brightness at the sixteen points is regarded as the coefficient of variations of the brightness of the sample.

In the present specification, various parameters such as the 60°-specular glossiness and the coefficient of variation of the brightness, and a 20°-specular glossiness, Δq, λq, a haze, and a total light transmittance, which will be described later, are measured at a temperature of 23±5 °C and a relative humidity of 40% or more and 65% or less, unless otherwise specified. Further, the measurement is performed after exposing the target sample to the atmosphere for 30 minutes or more and 60 minutes or less before starting each measurement.

<20°-Specular Glossiness>

The anti-glare film of the present disclosure has a 20°-specular glossiness measured from the uneven surface side of preferably 6.0 or less, more preferably 3.0 or less, further preferably 1.0 or less, and furthermore preferably 0.5 or less. Setting the 60°-specular glossiness within the above range and setting the 20°-specular glossiness to 6.0 or less can easily improve the anti-glare properties in all directions.

When the 20°-specular glossiness of the anti-glare film is too low, the video light tends to be scattered in transmitting the anti-glare film, and the dark-room contrast tends to decrease. Thus, the 20°-specular glossiness of the anti-glare film is preferably 0.01 or more, more preferably 0.02 or more, and further preferably 0.04 or more.

Examples of a preferable range of 20°-specular glossiness of the anti-glare film include 0.01 or more and 6.0 or less, 0.01 or more and 3.0 or less, 0.01 or more and 1.0 or less, 0.01 or more and 0.5 or less, 0.02 or more and 6.0 or less, 0.02 or more and 3.0 or less, 0.02 or more and 1.0 or less, 0.02 or more and 0.5 or less, 0.04 or more and 6.0 or less, 0.04 or more and 3.0 or less, 0.04 or more and 1.0 or less, and 0.04 or more and 0.5 or less.

<Δq and λq>

In the anti-glare film of the present disclosure, when a root mean square inclination of the uneven surface is defined as Δq and a root mean square wavelength of the uneven surface is defined as λq, Δq is preferably 0.250 μm/μm or more, and λq is preferably 17.000 μm or less.

Δq is correlated with an inclination angle of the uneven surface. More specifically, a larger Δq means a larger inclination angle of the uneven surface. Since Δq is a square parameter, Δq is a parameter that strongly reflects an effect by a larger inclination angle than an average inclination angle among the inclination. Therefore, Δq is a parameter different from the average inclination angle, which is a parameter simply averaging all inclinations.

λq is correlated with intervals of the unevenness of the uneven surface. More specifically, a smaller λq means a narrower interval of the unevenness of the uneven surface. As represented by the formula (A) described later, λq is a parameter calculated from the square parameters Δq and Rq. Thus, λq is a parameter strongly reflecting intervals of the unevenness with a large height difference and a large inclination angle among the unevenness. Therefore, λq is a parameter different from RSm of JIS, which is a parameter averaging all intervals of the unevenness.

Therefore, the uneven surface having Δq of 0.250 μm/μm or more and λq of 17.000 μm or less means that the unevenness with a large inclination angle is present with narrow intervals. In this way, it is considered that, when unevenness having a large inclination angle is present at narrow intervals, the 60°-specular glossiness, the 20°-specular glossiness, and the coefficient of variation of the brightness can be easily regulated within the aforementioned ranges for the following reasons (1) to (7). Particularly, setting λq to be small easily imparts the jet-black appearance to the anti-glare film. It is considered that the reason why setting λq to be small easily imparts the jet-black appearance to the anti-glare film is as follows.

The specular glossiness indicates light intensity in a specular reflection direction. Thus, even in a case where the light intensity in the specular reflection direction is small and the specular glossiness is small but light intensity in a direction other than the specular reflection direction is not small, the jet-black appearance cannot be imparted. It is considered that setting λq to be small can strengthen the following effects (1) to (5) to cause an observer to hardly feel the reflected scattered light, and thus the jet-black appearance can be more easily imparted.

When the unevenness having a large inclination angle is present at narrow intervals, it is considered that the 60°-specular glossiness and the 20°-specular glossiness can be easily regulated within the aforementioned ranges mainly for the following reasons (1) to (5).

(1) Since the adjacent peaks are close to each other, most of the reflected light reflected on the surface of any peak enters the adjacent peak. Then, the light repeats total reflection inside the adjacent peak, and finally travels opposite to the observer 700 (solid line image in FIG. 3).

(2) The reflected light of the light incident on the steep slope of any peak travels opposite to the observer 700 regardless of the adjacent peak (dashed line image in FIG. 3).

(3) Since the adjacent peaks are close to each other, there are few substantially flat regions that generate specular reflected light.

(4) The reflected light reflected by a substantially flat region present in a small proportion is likely to collide with the adjacent peak. Therefore, the angular distribution of the reflected light reflected by the substantially flat region is not biased to a predetermined angle, and becomes a substantially uniform angular distribution.

(5) The reflected light of the light incident on the gentle slope of any peak travels toward the observer 700 (dashed-dotted line image in FIG. 3). However, predetermined angular distribution is present also on the gentle slope of the peak, and the angular distribution is uniform within a range of the gentle angle. Thus, the angular distribution of the reflected light incident on the gentle slope is also not biased to a specific angle.

From (1) to (3) above, it is considered that the reflected scattered light can be suppressed, the 60°-specular glossiness and the 20°-specular glossiness can be regulated within the aforementioned ranges, and the anti-glare properties can be consequently improved.

Furthermore, from (4) and (5) above, even when a small amount of reflected scattered light is generated, the angular distribution of the reflected scattered light can be made uniform. Even when the amount of the reflected scattered light is very small, when the angular distribution of the reflected scattered light is biased to a specific angle, the light is recognized as reflected light. Therefore, the anti-glare properties can be made extremely good from (4) and (5) above.

Further, from (1) to (5) above, the observer can hardly perceive the reflected scattered light, which gives the anti-glare film a jet-black appearance, and furthermore, gives the image display device a luxurious feel.

When the unevenness having a large inclination angle is present at narrow intervals, it is considered that the coefficient of variation of the brightness can be easily regulated within the aforementioned ranges for mainly the following reasons (6) and (7).

(6) It is considered that the cause of the larger value of the coefficient of variation of the brightness is a phenomenon of the uneven surfaces playing a role of a lens to locally concentrate the video light. The above phenomenon tends to occur when the interval of the unevenness of the uneven surface is equal to or larger than the pixel interval of the display element. Thus, it is considered that the presence of the unevenness at narrow intervals on the uneven surface easily regulates the coefficient of variation of the brightness within the aforementioned range.

(7) When the inclination angle of the uneven surface is small, the uneven surface is approximated to a part of a circle to tend to concentrate the video light. On the other hand, when the inclination angle of the uneven surface is large, the uneven surface is approximated to a part of an ellipse to hardly concentrate the video light. Thus, it is considered that the large inclination angle of the uneven surface easily regulates the coefficient of variation of the brightness within the aforementioned range.

It is considered that the effects (6) and (7) synergistically affect to easily regulate the coefficient of variation of the brightness within the aforementioned range. Thus, the shape of the uneven surface preferably has Δq of 0.250 μm/μm or more and λq of 17.000 μm or less.

Δq is more preferably 0.275 μm/μm or more, more preferably 0.300 μm/μm or more, more preferably 0.325 μm/μm or more, more preferably 0.350 μm/μm or more, more preferably 0.400 μm/μm or more, and more preferably 0.485 μm/μm or more.

When Δq is too large, video light tends to be scattered when transmitting the anti-glare film, and dark-room contrast tends to decrease. When Δq is too large, a reflectance of video light increases, and a transmittance of the video light tends to decrease. Thus, Δq is preferably 0.800 μm/μm or less, more preferably 0.700 μm/μm or less, and further preferably 0.600 μm/μm or less.

Examples of the preferred range of Δq of the uneven surface include 0.250 μm/μm or more and 0.800 μm/μm or less, 0.250 μm/μm or more and 0.700 μm/μm or less, 0.250 μm/μm or more and 0.600 μm/μm or less, 0.275 μm/μm or more and 0.800 μm/μm or less, 0.275 μm/μm or more and 0.700 μm/μm or less, 0.275 μm/μm or more and 0.600 μm/μm or less, 0.300 μm/μm or more and 0.800 μm/μm or less, 0.300 μm/μm or more and 0.700 μm/μm or less, 0.300 μm/μm or more and 0.600 μm/μm or less, 0.325 μm/μm or more and 0.800 μm/μm or less, 0.325 μm/μm or more and 0.700 μm/μm or less, 0.325 μm/μm or more and 0.600 μm/μm or less, 0.350 μm/μm or more and 0.800 μm/μm or less, 0.350 μm/μm or more and 0.700 μm/μm or less, 0.350 μm/μm or more and 0.600 μm/μm or less, 0.400 μm/μm or more and 0.800 μm/μm or less, 0.400 μm/μm or more and 0.700 μm/μm or less, 0.400 μm/μm or more and 0.600 μm/μm or less, 0.485 μm/μm or more and 0.800 μm/μm or less, 0.485 μm/μm or more and 0.700 μm/μm or less, and 0.485 μm/μm or more and 0.600 μm/μm or less.

λq is more preferably 16.520 μm or less, more preferably 16.000 μm or less, more preferably 14.000 μm or less, and more preferably 12.000 μm or less.

When λq is too small, the video light tends to be scattered when transmitting the anti-glare film, and the dark-room contrast tends to decrease. Thus, λq is preferably 3.000 μm or more, more preferably 5.000 μm or more, and further preferably 7.000 μm or more.

Examples of the preferred range of λq of the uneven surface include 3.000 μm or more and 17.000 μm or less, 3.000 μm or more and 16.520 μm or less, 3.000 μm or more and 16.000 μm or less, 3.000 μm or more and 14.000 μm or less, 3.000 μm or more and 12.000 μm or less, 5.000 μm or more and 17.000 μm or less, 5.000 μm or more and 16.520 μm or less, 5.000 μm or more and 16.000 μm or less, 5.000 μm or more and 14.000 μm or less, 5.000 μm or more and 12.000 μm or less, 7.000 μm or more and 17.000 μm or less, 7.000 μm or more and 16.520 μm or less, 7.000 μm or more and 16.000 μm or less, 7.000 μm or more and 14.000 μm or less, and 7.000 μm or more and 12.000 μm or less.

<Rq>

To improve the anti-glare properties, Rq of the uneven surface of the anti-glare film of the present disclosure is preferably 0.300 μm or more, more preferably 0.350 μm or more, and further preferably 0.400 μm or more.

When Rq is too large, difference in the unevenness on the uneven surface becomes too large, and the uneven surface tends to be damaged. A site to be damaged by a wearing material is mainly near the convex portion among the uneven surface particularly because the site near the convex portion with high height tends to be damaged. Particularly, when Rq is large and Δq is large, the load tends to be applied at the site near the convex portion with high height. Thus, Rq is preferably 1.000 μm or less, more preferably 0.900 μm or less, more preferably 0.800 μm or less, and more preferably 0.720 μm or less.

Examples of the preferred range of Rq of the uneven surface include 0.300 μm or more and 1.000 μm or less, 0.300 μm or more and 0.900 μm or less, 0.300 μm or more and 0.800 μm or less, 0.300 μm or more and 0.720 μm or less, 0.350 μm or more and 1.000 μm or less, 0.350 μm or more and 0.900 μm or less, 0.350 μm or more and 0.800 μm or less, 0.350 μm or more and 0.720 μm or less, 0.400 μm or more and 1.000 μm or less, 0.400 μm or more and 0.900 μm or less, 0.400 μm or more and 0.800 μm or less, and 0.400 μm or more and 0.720 μm or less.

In the present specification, Δq means a parameter in which "a root mean square inclination on a roughness curve RΔq" defined in JIS B0601:2001 is extended to three-dimension.

In the present specification, Rq means a parameter in which "a root mean square height on a roughness curve Rq" defined in JIS B0601:2001 is extended to three-dimension.

In the present specification, λq means a parameter represented by the following formula (A) from Δq and Rq.

$$\lambda q = 2^{1.5}\pi(Rq/\Delta q) \quad \text{(A)}$$

Δq, Rq, and λq are preferably measured by using an interference microscope. Examples of interference microscopes include trade name "New View" series available from Zygo Corporation. By using the measurement/analysis application software "MetroPro" attached to the "New View" series described above, Δq, Rq, and λq can be easily calculated.

Measurement conditions for measuring Δq, Rq, and λq by using "New View" series described above is preferably according to conditions described in Examples. For example, "Filter Low Wavelen" (corresponding to c in JIS B0601) is preferably 800 μm. That is, Δq, Rq, and λq are preferably measured with a value corresponding to λc in accordance with JIS B0601 being 800 μm, and with an interferometry microscope. "Camera Res" (resolution) is preferably 0.3 μm or more and 0.5 μm or less, and more preferably 0.44 μm.

<Anti-Glare Layer>

The anti-glare layer suppresses reflected scattered light, responsible for the center of the anti-glare properties.

<<Method for Forming Anti-Glare Layer>>

The anti-glare layer can be formed, for example, by (A) shaping with an embossing roll, (B) an etching treatment, (C) molding with a mold, (D) formation of a coating film by coating, or the like. Among these methods, (C) molding with a mold is suitable for easily obtaining a stable surface shape, and (D) formation of a coating film by coating is suitable for productivity and compatibility with various products.

When the coating film (anti-glare layer) is formed by the method (D), examples of the method include a method (d1) in which a coating liquid containing a binder resin and particles is applied to form unevenness by the particles, and a method (d2) in which a coating liquid containing any resin and a resin having poor compatibility with the resin is applied to phase-separate the resins to form unevenness. The method (D) may be any of (d1) and (d2), but (d1) is preferred to (d2) in terms of control ease of Δq, λq, and Rq.

<<Thickness>>

The thickness T of the anti-glare layer is preferably 2 μm or more and 10 μm or less, more preferably 4 μm or more and 8 μm or less, in order to achieve a good balance among curl suppression, mechanical strength, hardness, and toughness.

The thickness of the anti-glare layer can be calculated, for example, by selecting 20 arbitrary points in a cross-sectional photograph of the anti-glare film taken with a scanning transmission electron microscope (STEM) and averaging the values. It is preferable that the acceleration voltage of the STEM is 10 kV or more and 30 kV or less, and the magnification of the STEM is 1000 times or more and 7000 times or less.

Embodiments of a preferable range of the thickness of the anti-glare layer include 2 μm or more and 10 μm or less, 2 μm or more and 8 μm or less, 4 μm or more and 10 μm or less, and 4 μm or more and 8 μm or less.

<<Components>>

The anti-glare layer mainly contains a resin component, and optionally contains particles such as organic particles and inorganic fine particles, and additives such as a refractive index adjuster, an anti-static agent, an anti-fouling agent, an ultraviolet absorber, a light stabilizer, an antioxidant, a viscosity modifier, and a thermal polymerization initiator.

The anti-glare layer preferably contains a binder resin and particles. Examples of the particles include organic particles and inorganic particles, and inorganic particles are preferred. That is, the anti-glare layer more preferably contains a binder resin and inorganic particles. The anti-glare layer further preferably contains a binder resin, inorganic particles, and organic particles.

—Particles—

Examples of the organic particles include particles made of polymethyl methacrylate, a polyacryl-styrene copolymer, a melamine resin, polycarbonate, polystyrene, polyvinyl chloride, a benzoguanamine-melamine-formaldehyde condensate, silicone, a fluorine-based resin, and a polyester-based resin. Examples of the inorganic particles include silica, alumina, zirconia, and titania, and silica is preferred. Among the inorganic particles, irregularly shaped inorganic particles are preferred, and irregularly shaped silica is more preferred.

By using the irregularly shaped inorganic particles such as irregularly shaped silica as the particles, a steep roughness interval is easily formed, and thus Δq can be easily set to be large.

When the irregularly shaped inorganic particles such as irregularly shaped silica are used as the particles, a content ratio of the irregularly shaped inorganic particles in the anti-glare layer is preferably increased in order to easily set Δq and λq within the aforementioned range. By increasing the content ratio of the irregularly shaped inorganic particles in the anti-glare layer, it is possible to form a shape in which the irregularly shaped inorganic particles are spread all over the surface to easily set λq to be small. Further, by adding organic particles in addition to the irregularly shaped inorganic particles, excessive aggregation of the irregularly shaped inorganic particles is suppressed and the narrow roughness structure can be retained, and thus λq can be set to be small. A mass ratio between the inorganic irregularly shaped particles and the organic particles is preferably 5:1 to 1:1, and more preferably 4:2 to 2:1.

When the inorganic particles are used as the particles, the anti-glare layer preferably contains inorganic fine particles, described later, in order to easily set Δq and Δq within the aforementioned range.

The average particle size D of particles such as organic particles and inorganic particles is preferably 1.0 μm or more and 10.0 μm or less, more preferably 1.5 μm or more and 8.0 μm or less, and still more preferably 1.7 μm or more and 6.0 μm or less.

By setting the average particle size D to 1.0 μm or more, Rq can be easily increased. Among the particles, the irregularly shaped inorganic particles easily increase Δq and Rq. By setting the average particle size D to 10.0 μm or less, λq can be easily set to be small, and Δq and Rq can be easily suppressed from becoming too small.

Embodiments of a preferable range of the average particle size of the particles include 1.0 μm or more and 10.0 μm or less, 1.0 μm or more and 8.0 μm or less, 1.0 μm or more and 6.0 μm or less, 1.5 μm or more and 10.0 μm or less, 1.5 μm or more and 8.0 μm or less, 1.5 μm or more and 6.0 μm or less, 1.7 μm or more and 10.0 μm or less, 1.7 μm or more and 8.0 μm or less, and 1.7 μm or more and 6.0 μm or less.

The average particle size of particles such as organic particles and inorganic particles can be calculated by the following operations (A1) to (A3).

(A1) A transmission observation image of the anti-glare film is imaged with an optical microscope. The magnification is preferably 500 times or more and 2000 times or less.

(A2) Any 10 particles are extracted from the observed image and the particle size of each particle is calculated. The particle size is measured as the linear distance in a combination of two straight lines such that the linear distance between the two straight lines is maximum when the cross-section of the particle is sandwiched between two arbitrary parallel straight lines.

(A3) The same operation is performed five times on an observation image of another screen of the same sample, and a value obtained from the number average of the particle size of 50 particles in total is defined as the average particle size of the particles.

When the particles are irregularly shaped inorganic particles, the average particle size can be measured as a volume-average particle size by a laser diffraction method.

The ratio D/T of the thickness T of the anti-glare layer and the average particle size D of the particles is preferably 0.20 or more and 0.96 or less, more preferably 0.25 or more and 0.90 or less, still more preferably 0.30 or more and 0.80 or less, and further preferably 0.35 or more and 0.70 or less. By setting D/T within the above range, it is possible to easily set the height of the peaks and the interval between the peaks of the uneven surface to be in an appropriate range, and to easily set Δq, λq, and Rq to be in the range described above. By setting D/T to 0.96 or less, Rq can be easily suppressed from becoming too large.

Examples of the preferred range of D/T include 0.20 or more and 0.96 or less, 0.20 or more and 0.90 or less, 0.20 or more and 0.80 or less, 0.20 or more and 0.70 or less, 0.25 or more and 0.96 or less, 0.25 or more and 0.90 or less, 0.25 or more and 0.80 or less, 0.25 or more and 0.70 or less, 0.30 or more and 0.96 or less, 0.30 or more and 0.90 or less, 0.30 or more and 0.80 or less, 0.30 or more and 0.70 or less, 0.35 or more and 0.96 or less, 0.35 or more and 0.90 or less, 0.35 or more and 0.80 or less, and 0.35 or more and 0.70 or less.

The content of particles such as organic particles and inorganic particles is preferably 10 parts by mass or more and 200 parts by mass or less, more preferably 15 parts by mass or more and 170 parts by mass or less, and still more preferably 20 parts by mass or more and 150 parts by mass or less based on 100 parts by mass of the binder resin.

By setting the content of the particles to 10 parts by mass or more, Δq and Rq can be easily set to be large, and λq is easily set to be small. By setting the content of the particles to 200 parts by mass or less, the particles can be easily suppressed from falling off from the anti-glare layer.

When the organic particles are used and the irregularly shaped inorganic particles are not used as the particles, the content of the particles is preferably set to a relatively large amount in the above range in order to easily exhibit "particle spreading" and "particle stacking". When the irregularly shaped inorganic particles are used as the particles, the content of the particles is preferably set to a relatively small amount in the above range in order to suppress Δq and Rq from becoming too large.

Embodiments of a preferable range of the content of the particles with respect to 100 parts by mass of the binder resin include 10 parts by mass or more and 200 parts by mass or less, 10 parts by mass or more and 170 parts by mass or less, 10 parts by mass or more and 150 parts by mass or less, 15 parts by mass or more and 200 parts by mass or less, 15 parts by mass or more and 170 parts by mass or less, 15 parts by mass or more and 150 parts by mass or less, 20 parts by mass or more and 200 parts by mass or less, 20 parts by mass or more and 170 parts by mass or less, and 20 parts by mass or more and 150 parts by mass or less.

—Inorganic Fine Particles—

The anti-glare layer preferably further contains inorganic fine particles in addition to the binder resin and the particles. In the present specification, the inorganic fine particles and the aforementioned particles can be distinguished with the average particle size. By containing the inorganic fine particles in the anti-glare layer, fine unevenness is formed between peaks of the uneven surface, and specular reflected light is easily reduced. By containing the inorganic fine particles in the anti-glare layer, the difference between the refractive index of the particles and the refractive index of the composition other than the particles of the anti-glare layer becomes small, and the internal haze can be easily reduced. When the anti-glare layer contains the inorganic fine particles, the viscosity of the anti-glare layer-coating liquid can be increased, so that the particles are less likely to sink. Therefore, when the anti-glare layer contains the inorganic fine particles, Δq is easily increased, and λq is easily reduced. When the anti-glare layer contains the inorganic fine particles, the particles are preferably the organic particles.

Examples of the inorganic fine particles include fine particles made of silica, alumina, zirconia, and titania. Among these, silica is preferable since it easily suppresses the generation of internal haze.

The average particle size of the inorganic fine particles is preferably 1 nm or more and 200 nm or less, more preferably 2 nm or more and 100 nm or less, and still more preferably 5 nm or more and 50 nm or less.

Examples of the preferred range of the average particle size of the inorganic fine particles include 1 nm or more and 200 nm or less, 1 nm or more and 100 nm or less, 1 nm or more and 50 nm or less, 2 nm or more and 200 nm or less, 2 nm or more and 100 nm or less, 2 nm or more and 50 nm or less, 5 nm or more and 200 nm or less, 5 nm or more and 100 nm or less, and 5 nm or more and 50 nm or less.

The average particle size of the inorganic fine particles can be calculated by the following operations (B1) to (B3).

(B1) A cross-section of the anti-glare film is imaged with a TEM or STEM. The acceleration voltage of the TEM or STEM is preferably 10 kV or more and 30 kV or less, and the magnification is preferably 50,000 times or more and 300,000 times or less.

(B2) Any 10 inorganic fine particles are extracted from the observed image and the particle size of each inorganic fine particle is calculated. The particle size is measured as the linear distance in a combination of two straight lines such that the linear distance between the two straight lines is maximum when the cross-section of the inorganic fine particle is sandwiched between two arbitrary parallel straight lines.

(B3) The same operation is performed five times on an observation image of another screen of the same sample, and a value obtained from the number average of the particle size of 50 particles in total is defined as the average particle size of the inorganic fine particles.

The content of inorganic fine particles is preferably 10 parts by mass or more and 200 parts by mass or less, more preferably 15 parts by mass or more and 150 parts by mass or less, and still more preferably 20 parts by mass or more and 80 parts by mass or less based on 100 parts by mass of the binder resin.

By setting the content of the inorganic fine particles to 10 parts by mass or more, the aforementioned effect based on the inorganic fine particles can be easily obtained. By setting the content of the inorganic fine particles to 200 parts by mass or less, a decrease in coating film strength of the anti-glare layer can be easily suppressed, and prevention of flowability of the particles is suppressed, and Δq, λq, and Rq are easily set within the aforementioned ranges.

Embodiments of a preferable range of the content of the inorganic fine particles with respect to 100 parts by mass of the binder resin include 10 parts by mass or more and 200 parts by mass or less, 10 parts by mass or more and 150 parts by mass or less, 10 parts by mass or more and 80 parts by mass or less, 15 parts by mass or more and 200 parts by mass or less, 15 parts by mass or more and 150 parts by mass or less, 15 parts by mass or more and 80 parts by mass or less, 20 parts by mass or more and 200 parts by mass or less, 20 parts by mass or more and 150 parts by mass or less, and 20 parts by mass or more and 80 parts by mass or less.

—Binder Resin—

In order to further improve the mechanical strength, the binder resin preferably contains a cured product of a curable resin such as a cured product of a thermosetting resin composition or a cured product of an ionizing radiation-curable resin composition, and more preferably contains a cured product of an ionizing radiation-curable resin composition.

The thermosetting resin composition is a composition containing at least a thermosetting resin, and is a resin composition that is cured by heating.

Examples of thermosetting resins include acrylic resins, urethane resins, phenol resins, urea melamine resins, epoxy resins, unsaturated polyester resins, and silicone resins. If necessary, a curing agent is added to these curable resins in the thermosetting resin composition.

The ionizing radiation-curable resin composition is a composition containing a compound having an ionizing radiation-curable functional group (hereinafter also referred to as an "ionizing radiation-curable compound"). Examples of the ionizing radiation-curable functional group include ethylenically unsaturated bond groups such as a (meth) acryloyl group, a vinyl group, and an allyl group; an epoxy group; and an oxetanyl group. The ionizing radiation-curable compound is preferably a compound having an ethylenically unsaturated bond group, more preferably a compound having two or more ethylenically unsaturated bond groups, and in particular, still more preferably a polyfunctional (meth)acrylate-based compound having two or more ethylenically unsaturated bond groups. Both monomers and oligomers can be used as polyfunctional (meth)acrylate-based compounds.

The ionizing radiation means an electromagnetic wave or a charged particle beam having an energy quantum capable of polymerizing or crosslinking a molecule, and an ultraviolet ray (UV) or an electron beam (EB) is usually used, but an electromagnetic wave such as an X-ray or a γ-ray, or a charged particle beam such as an α-ray or an ion beam can also be used.

Among the polyfunctional (meth)acrylate-based compounds, examples of the bifunctional (meth)acrylate-based monomer include ethylene glycol di(meth)acrylate, bisphenol A tetraethoxy diacrylate, bisphenol A tetrapropoxy diacrylate, and 1,6-hexanediol diacrylate.

Examples of the (meth)acrylate-based monomer having three or more functional groups include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The (meth)acrylate-based monomer may be a monomer in which a part of the molecular skeleton is modified. For example, a monomer in which a part of the molecular skeleton is modified with ethylene oxide, propylene oxide, caprolactone, isocyanuric acid, alkyl, cyclic alkyl, aromatic, bisphenol, or the like can also be used as the (meth)acrylate-based monomer.

Examples of polyfunctional (meth)acrylate-based oligomers include acrylate-based polymers such as urethane (meth)acrylate, epoxy (meth)acrylate, polyester (meth)acrylate, and polyether (meth)acrylate.

Urethane (meth)acrylate is obtained, for example, by reacting polyhydric alcohol and organic diisocyanate with hydroxy (meth)acrylate.

Preferred epoxy (meth)acrylates are (meth)acrylates obtained by reacting a trifunctional or more aromatic epoxy resin, alicyclic epoxy resin, or aliphatic epoxy resin with a (meth)acrylic acid, (meth)acrylates obtained by reacting a bifunctional or more aromatic epoxy resin, alicyclic epoxy resin, or aliphatic epoxy resin with a polybasic acid and (meth)acrylic acid, and (meth)acrylates obtained by reacting a bifunctional or more aromatic epoxy resin, alicyclic epoxy resin, or aliphatic epoxy resin with phenol and (meth)acrylic acid.

For the purpose of adjusting the viscosity of the anti-glare layer-coating liquid or the like, a monofunctional (meth) acrylate may be used in combination as the ionizing radiation-curable compound. Examples of the monofunctional (meth)acrylate include methyl (meth)acrylate, ethyl (meth) acrylate, propyl (meth)acrylate, butyl (meth)acrylate, pentyl (meth)acrylate, hexyl (meth)acrylate, cyclohexyl (meth) acrylate, 2-ethylhexyl (meth)acrylate, lauryl (meth)acrylate, stearyl (meth)acrylate, and isobornyl (meth)acrylate.

The ionizing radiation-curable compounds may be used singly or in combination of two or more.

When the ionizing radiation-curable compound is an ultraviolet-curable compound, the ionizing radiation-curable composition preferably contains an additive such as a photopolymerization initiator or a photopolymerization accelerator.

Examples of the photopolymerization initiator include one or more selected from the group consisting of acetophenone, benzophenone, α-hydroxyalkylphenone, Michler's ketone, benzoin, benzyl dimethyl ketal, benzoyl benzoate, α-acyloxime ester, thioxanthones, and the like.

The photopolymerization accelerator can reduce polymerization inhibition caused by air during curing and increase the curing rate. Examples of the accelerator include p-dimethylaminobenzoic acid isoamyl ester, p-dimethylaminobenzoic acid ethyl ester, and the like.

When the binder resin contains a cured product of an ionizing radiation-curable resin composition, the binder resin preferably has a configuration (C1) or (C2) as described below.

(C1) A thermoplastic resin is contained as the binder resin in addition to the cured product of the ionizing radiation-curable resin composition.

(C2) Substantially only the cured product of the ionizing radiation-curable resin composition is contained as the binder resin, and 70% by mass or more of a monomer component is contained as the ionizing radiation-curable compound contained in the ionizing radiation-curable resin composition.

In the embodiment C1 described above, the viscosity of the anti-glare layer-coating liquid is increased by the thermoplastic resin, so that the organic particles are less likely to sink, and the binder resin is less likely to flow down between the peaks. Therefore, in the embodiment C1 above, it is possible to easily set Δq to be large, and easily set λq to be small. In the embodiment C1 above, a case where the anti-glare layer contains the inorganic fine particles is preferable because the viscosity of the anti-glare layer-coating liquid can be more increased by the inorganic fine particles.

In the embodiment C1 above, the organic particles are preferably used as the particles, and the inorganic fine particles are preferably contained.

Examples of the thermoplastic resin include polystyrene-based resins, polyolefin-based resins, ABS resins (including heat-resistant ABS resins), AS resins, AN resins, polyphenylene oxide-based resins, polycarbonate-based resins, polyacetal-based resins, acrylic resins, polyethylene terephthalate-based resins, polybutylene terephthalate-based resins, polysulfone-based resins, and polyphenylene sulfide-based resins, and acrylic resin is preferable to improve transparency.

The weight-average molecular weight of the thermoplastic resin is preferably 20,000 or more and 200,000 or less, more preferably 30,000 or more and 150,000 or less, and still more preferably 50,000 or more and 100,000 or less.

In the present specification, the weight-average molecular weight is the average molecular weight measured by GPC analysis and converted to standard polystyrene.

Examples of the preferred range of the weight-average molecular weight of the thermoplastic resin include 20,000 or more and 200,000 or less, 20,000 or more and 150,000 or less, 20,000 or more and 100,000 or less, 30,000 or more and 200,000 or less, 30,000 or more and 150,000 or less, 30,000 or more and 100,000 or less, 50,000 or more and 200,000 or less, 50,000 or more and 150,000 or less, and 50,000 or more and 100,000 or less.

In the embodiment C1 above, the mass ratio of the cured product of the ionizing radiation-curable resin composition and the thermoplastic resin is preferably 60:40 to 90:10, and more preferably 70:30 to 80:20.

By setting the thermoplastic resin to 10 or more with respect to the cured product 90 of the ionizing radiation-curable resin composition, the effect of increasing the viscosity of the anti-glare layer-coating liquid described above can be easily exhibited. By setting the thermoplastic resin to 40 or less with respect to the cured product 60 of the ionizing radiation-curable resin composition, the decrease in the mechanical strength of the anti-glare layer can be easily suppressed.

In the embodiment C2 above, the particles are spread all over the bottom portion of the anti-glare layer, and the particles are stacked in a part of the region, and these particles tend to be covered with a thin-skinned binder resin. Thus, in the embodiment C2 above, Δq can be easily set to be large by the stacked particles, and λq can be easily set to be small by the spread particles.

In the embodiment C2 above, the particles are preferably the inorganic particles, more preferably the irregularly shaped inorganic particles, and further preferably irregularly shaped silica. In the embodiment C2 above, the organic particles are preferably contained in addition to the inorganic particles.

In the C2 above, the ratio of the cured product of the ionizing radiation-curable resin composition to the total amount of the binder resin is preferably 90% by mass or more, more preferably 95% by mass or more, and still more preferably 100% by mass.

In the C2 above, the ratio of the monomer component to the total amount of the ionizing radiation-curable compound is preferably 70% by mass or more, and more preferably 75% by mass or more. The monomer component is preferably a polyfunctional (meth)acrylate-based compound.

A solvent is preferably contained in the anti-glare layer-coating liquid to adjust the viscosity and to dissolve or disperse each component. Since the surface shape of the anti-glare layer after coating and drying differs depending on the type of solvent, it is preferable to select the solvent in consideration of the saturated vapor pressure of the solvent, the permeability of the solvent to the transparent substrate, and the like.

Examples of the solvent include: ketones such as acetone, methyl ethyl ketone, methyl isobutyl ketone, and cyclohexanone; ethers such as dioxane and tetrahydrofuran; aliphatic hydrocarbons such as hexane; alicyclic hydrocarbons such as cyclohexane; aromatic hydrocarbons such as toluene and xylene; halogenated carbons such as dichloromethane and dichloroethane; esters such as methyl acetate, ethyl acetate, and butyl acetate; alcohols such as isopropanol, butanol, and cyclohexanol; cellosolves such as methyl cellosolve and ethyl cellosolve; glycol ethers such as propylene glycol monomethyl ether acetate; cellosolve acetates; sulfoxides such as dimethyl sulfoxide; and amides such as dimethylformamide and dimethylacetamide. The solvent may be singly used, or may be a mixture of two or more.

It is preferable that the main component of the solvent in the anti-glare layer-coating liquid is a solvent having a high evaporation rate. By increasing the evaporation rate of the solvent, the particles are prevented from settling to the bottom portion of the anti-glare layer, and the binder resin is less likely to flow down between the peaks. Therefore, Δq can be easily set to be large, and λq can be easily set to be small.

The main component means 50% by mass or more, preferably 70% by mass or more, and more preferably 80% by mass or more of the total amount of the solvent.

In the present specification, a solvent having a high evaporation rate means a solvent having an evaporation rate of 100 or more when the evaporation rate of butyl acetate is 100. The evaporation rate of the solvent having a high evaporation rate is more preferably 120 or more and 300 or less, still more preferably 150 or more and 220 or less.

Examples of solvents having a high evaporation rate include methyl isobutyl ketone having an evaporation rate of 160, toluene having an evaporation rate of 200, and methyl ethyl ketone having an evaporation rate of 370.

The solvent in the anti-glare layer-coating liquid preferably also contains a small amount of solvent having a low evaporation rate in addition to the solvent having a high evaporation rate. By containing a small amount of a solvent having a low evaporation rate, the particles are agglomerated, and Δq and Rq can be easily set to be large. Note that, in order to suppress Rq from becoming too large, it is important that a content of the solvent having a low evaporation rate is set to be small.

The mass ratio of the solvent having a high evaporation rate and the solvent having a low evaporation rate is preferably 99:1 to 80:20, more preferably 98:2 to 85:15.

In the present specification, a solvent having a low evaporation rate means a solvent having an evaporation rate of less than 100 when the evaporation rate of butyl acetate is 100. The evaporation rate of the solvent having a low evaporation rate is more preferably 20 or more and 60 or less, and still more preferably 25 or more and 40 or less.

Examples of solvents having a low evaporation rate include cyclohexanone having an evaporation rate of 32 and propylene glycol monomethyl ether acetate having an evaporation rate of 44.

It is preferable to control the drying conditions when forming the anti-glare layer from the anti-glare layer-coating liquid.

The drying conditions can be controlled by the drying temperature and the wind speed inside the dryer. The drying temperature is preferably 30 °C or more and 120 °C or less, and the drying wind speed is preferably 0.2 m/s or more and 50 m/s or less. In order to control the surface shape of the anti-glare layer by drying, the irradiation with ionizing-radiation is preferably performed after the drying of the coating liquid.

<Optical Characteristics>

The anti-glare film preferably has a total light transmittance in accordance with JIS K7361-1:1997 of 70% or more, more preferably 80% or more, and still more preferably 85% or more.

The light incident surface for measuring total light transmittance and haze, which will be described later, is the opposite side of the uneven surface.

The anti-glare film has a haze in accordance with JIS K7136:2000 of preferably 20% or more and 98% or less, more preferably 30% or more and 98% or less, more preferably 40% or more and 98% or less, more preferably 50% or more and 80% or less, and more preferably 55% or more and 70% or less.

Setting the haze to 20% or more can easily improve the anti-glare properties. To more easily improve the anti-glare properties, the haze is preferably 40% or more. By setting the haze to 98% or less, the deterioration in image resolution can be easily suppressed.

Examples of the preferred range of the haze of the anti-glare film include 20% or more and 98% or less, 20% or more and 80% or less, 20% or more and 70%, 4 or less, 30% or more and 98% or less, 30% or more and 80% or less, 30% or more and 70% or less, 40% or more and 98% or less, 40% or more and 80% or less, 40% or more and 70% or less, 50% or more and 98% or less, 50% or more and 80% or less, 50% or more and 70% or less, 55% or more and 98% or less, 55% or more and 80% or less, and 55% or more and 70% or less.

The anti-glare film preferably has an internal haze of 20% or less, more preferably 15% or less, and still more preferably 10% or less in order to facilitate better image resolution and contrast.

Internal haze can be measured by a general-purpose method. For example, internal haze can be measured by laminating a transparent sheet on the uneven surface via a transparent self-adhesive layer to flatten the unevenness of the uneven surface.

As for a transmitted image clearness of the anti-glare film measured in accordance with JIS K7374:2007, when a transmitted image clearness with a width of an optical comb of 0.125 mm is defined as $C_{0.125}$, a transmitted image clearness with a width of an optical comb of 0.25 mm is defined as $C_{0.25}$, a transmitted image clearness with a width of an optical comb of 0.5 mm is defined as $C_{0.5}$, a transmitted image clearness with a width of an optical comb of 1.0 mm is defined as $C_{1.0}$, and a transmitted image clearness with a width of an optical comb of 2.0 mm is defined as $C_{2.0}$, values of $C_{0.125}$, $C_{0.25}$, $C_{0.5}$, $C_{1.0}$, and $C_{2.0}$ are preferably within the following ranges.

To improve the anti-glare properties, $C_{0.125}$ is preferably 50% or less, more preferably 40% or less, more preferably 30% or less, and more preferably 20% or less. To improve the resolution, $C_{0.125}$ is preferably 1.0% or more. Examples of the range of $C_{0.125}$ include 1.0/0 or more and 50% or less, 1.0% or more and 40% or less, 1.0% or more and 30% or less, and 1.0% or more and 20% or less.

To improve the anti-glare properties, $C_{0.25}$ is preferably 50% or less, more preferably 40% or less, more preferably 30% or less, and more preferably 20% or less. To improve the resolution, $C_{0.25}$ is preferably 1.0% or more. Examples of the range of $C_{0.25}$ include 1.0% or more and 50% or less, 1.0% or more and 40% or less, 1.0% or more and 30% or less, and 1.0% or more and 20% or less.

To improve the anti-glare properties, $C_{0.5}$ is preferably 50% or less, more preferably 40% or less, more preferably 30% or less, and more preferably 20% or less. To improve the resolution, $C_{0.5}$ is preferably 1.0% or more. Examples of the range of $C_{0.5}$ include 1.0% or more and 50% or less, 1.0% or more and 40% or less, 1.0% or more and 30% or less, and 1.0% or more and 20% or less.

To improve the anti-glare properties, $C_{1.0}$ is preferably 50% or less, more preferably 40% or less, more preferably 30% or less, and more preferably 20% or less. To improve the resolution, $C_{1.0}$ is preferably 1.0% or more. Examples of the range of $C_{1.0}$ include 1.0% or more and 50% or less, 1.0% or more and 40% or less, 1.0% or more and 30% or less, and 1.0% or more and 20% or less.

To improve the anti-glare properties, $C_{2.0}$ is preferably 50% or less, more preferably 40% or less, more preferably 30% or less, and more preferably 20% or less. To improve the resolution, $C_{2.0}$ is preferably 5.0% or more. Examples of the range of $C_{2.0}$ include 5.0% or more and 50% or less, 5.0% or more and 40% or less, 5.0% or more and 30% or less, and 5.0% or more and 20% or less.

To improve the anti-glare properties of the anti-glare film, a total of $C_{0.25}$, $C_{0.5}$, $C_{1.0}$, and $C_{2.0}$ is preferably 200% or less, more preferably 150% or less, more preferably 100% or less, and more preferably 80% or less. To improve the resolution, the total is preferably 10.0% or more. Examples of a range of the total include 10.0% or more and 200% or less, 10.0% or more and 150% or less, 10.0% or more and 100% or less, and 10.0% or more and 80% or less.

<Other Layers>

The anti-glare film may have a layer other than the anti-glare layer and transparent substrate described above. Examples of the other layers include an anti-reflection layer, an anti-fouling layer, and an anti-static layer.

Examples of a preferred embodiment in which another layer is provided include an embodiment in which an anti-reflection layer is provided on the uneven surface of the anti-glare layer and a surface of the anti-reflection layer is the uneven surface of the anti-glare film. The anti-reflection layer more preferably has antifouling properties. That is, it is more preferable that the antifouling anti-reflection layer is provided on the anti-glare layer and the surface of the antifouling anti-reflection layer is the uneven surface of the anti-glare film.

<<Anti-Reflection Layer>>

The anti-reflection layer may have a single-layer structure of a low refractive index layer; a two-layer structure of a high refractive index layer and a low refractive index layer; or a multilayer structure of three or more layers, for example. The low refractive index layer and the high refractive index layer can be formed by a general-purpose wet method, dry method, or the like. The single-layer structure or two-layer structure is preferred in the case of the wet method, and the multi-layer structure is preferred in the case of the dry method.

—Single-Layer Structure or Two-Layer Structure—

A single-layer structure or a two-layer structure is preferably formed by a wet method.

The low refractive index layer is preferably disposed on the outermost surface of the anti-glare film. When imparting antifouling properties to the anti-reflection layer, the low refractive index layer preferably contains an antifouling agent such as a silicone-based compound and a fluorine-based compound.

The lower limit of the refractive index of the low refractive index layer is preferably 1.10 or more, more preferably 1.20 or more, more preferably 1.26 or more, more preferably 1.28 or more, and more preferably 1.30 or more, and the upper limit thereof is preferably 1.48 or less, more preferably 1.45 or less, more preferably 1.40 or less, more preferably 1.38 or less, and more preferably 1.32 or less.

Examples of the preferred range of the refractive index of the low refractive index layer include 1.10 or more and 1.48 or less, 1.10 or more and 1.45 or less, 1.10 or more and 1.40 or less, 1.10 or more and 1.38 or less, 1.10 or more and 1.32 or less, 1.20 or more and 1.48 or less, 1.20 or more and 1.45 or less, 1.20 or more and 1.40 or less, 1.20 or more and 1.38 or less, 1.20 or more and 1.32 or less, 1.26 or more and 1.48 or less, 1.26 or more and 1.45 or less, 1.26 or more and 1.40 or less, 1.26 or more and 1.38 or less, 1.26 or more and 1.32 or less, 1.28 or more and 1.48 or less, 1.28 or more and 1.45 or less, 1.28 or more and 1.40 or less, 1.28 or more and 1.38 or less, 1.28 or more and 1.32 or less, 1.30 or more and 1.48 or less, 1.30 or more and 1.45 or less, 1.30 or more and 1.40 or less, 1.30 or more and 1.38 or less, and 1.30 or more and 1.32 or less.

The lower limit of the thickness of the low refractive index layer is preferably 80 nm or more, more preferably 85 nm or more, more preferably 90 nm or more, and the upper limit thereof is preferably 150 nm or less, more preferably 110 nm or less, and more preferably 105 nm or less.

Examples of the preferred range of the thickness of the low refractive index layer include 80 nm or more and 150 nm or less, 80 nm or more and 110 nm or less, 80 nm or more and 105 nm or less, 85 nm or more and 150 nm or less, 85 nm or more and 110 nm or less, 85 nm or more and 105 nm or less, 90 nm or more and 150 nm or less, 90 nm or more and 110 nm or less, and 90 nm or more and 105 nm or less.

The high refractive index layer is preferably disposed closer to the anti-glare layer than the low refractive index layer.

The lower limit of the refractive index of the high refractive index layer is preferably 1.53 or more, more preferably 1.54 or more, more preferably 1.55 or more, more preferably 1.56 or more, and the upper limit thereof is preferably 1.85 or less, more preferably 1.80 or less, more preferably 1.75 or less, and more preferably 1.70 or less.

Examples of the preferred range of the refractive index of the high refractive index layer include 1.53 or more and 1.85 or less, 1.53 or more and 1.80 or less, 1.53 or more and 1.75 or less, 1.53 or more and 1.70 or less, 1.54 or more and 1.85 or less, 1.54 or more and 1.80 or less, 1.54 or more and 1.75 or less, 1.54 or more and 1.70 or less, 1.55 or more and 1.85 or less, 1.55 or more and 1.80 or less, 1.55 or more and 1.75 or less, 1.55 or more and 1.70 or less, 1.56 or more and 1.85 or less, 1.56 or more and 1.80 or less, 1.56 or more and 1.75 or less, and 1.56 or more and 1.70 or less.

The upper limit of the thickness of the high refractive index layer is preferably 200 nm or less, more preferably 180 nm or less, still more preferably 150 nm or less, and the lower limit is preferably 50 nm or more, and more preferably 70 nm or more.

Examples of the preferred range of the thickness of the high refractive index layer include 50 nm or more and 200 nm or less, 50 nm or more and 180 nm or less, 50 nm or more and 150 nm or less, 70 nm or more and 200 nm or less, 70 nm or more and 180 nm or less, and 70 nm or more and 150 nm or less.

—Multilayer Structure of Three or More Layers—

The multilayer structure preferably formed by the dry method has a structure in which high refractive index layers and low refractive index layers are alternately laminated to form a total of three or more layers. Also in the multilayer structure, the low refractive index layer is preferably disposed on the outermost surface of the anti-glare film.

The high refractive index layer preferably has a thickness of 10 nm or more and 200 nm or less, and preferably has a refractive index of 2.10 or more and 2.40 or less. The thickness of the high refractive index layer is more preferably 20 nm or more and 70 nm or less.

The low refractive index layer preferably has a thickness of 5 nm or more and 200 nm or less, and preferably has a refractive index of 1.33 or more and 1.53 or less. The thickness of the low refractive index layer is more preferably 20 nm or more and 120 nm or less.

<Size, Shape, and the Like>

The anti-glare film may be in the form of a sheet cut into a predetermined size, or may be in the form of a roll obtained by winding a long sheet. The size of the sheet is not particularly limited, but the maximum size is about 2 inches or more and 500 inches or less. The "maximum size" refers to the maximum length of any two points of the anti-glare film when connected. For example, when the anti-glare film is rectangular, the diagonal line of the rectangle is the maximum size. When the anti-glare film is circular, the diameter of the circle is the maximum size.

The width and length of the roll are not particularly limited, but generally, the width is 500 mm or more and 3000 mm or less and the length is about 500 m or more and 5000 m or less. The anti-glare film in the form of a roll may be cut into a sheet according to the size of an image display device or the like. At the time of cutting, it is preferable to exclude the end portion of the roll where the physical properties are not stable.

The shape of the sheet is not particularly limited, and examples thereof include polygons such as triangles, quadrilaterals, and pentagons, circles, and random irregular shapes. More specifically, when the anti-glare film has a square shape, the aspect ratio is not particularly limited as long as there is no problem as a display screen. For example, the aspect ratio may be horizontal:vertical=1:1, 4:3, 16:10, 16:9, 2:1, or the like. The aspect ratio is often not limited to such an aspect ratio in in-vehicle applications and digital signage which are rich in design.

The surface shape of the anti-glare film on the side opposite to the uneven surface is not particularly limited, but is preferably substantially smooth. Substantially smooth means that the arithmetic mean roughness Ra of JIS B0601: 2001 is less than 0.03 μm, preferably 0.02 μm or less.

[Polarizing Plate]

The polarizing plate of the present disclosure is a polarizing plate comprising:

- a polarizer;
- a first transparent protective plate disposed on one side of the polarizer; and
- a second transparent protective plate disposed on the other side of the polarizer, wherein
- at least one of the first transparent protective plate and the second transparent protective plate is the aforementioned anti-glare film of the present disclosure, and a surface opposite to the uneven surface of the anti-glare film and the polarizer are disposed so as to face each other.

<Polarizer>

Examples of the polarizer include: sheet-type polarizers such as a polyvinyl alcohol film, a polyvinyl formal film, a polyvinyl acetal film, and an ethylene-vinyl acetate copolymer saponified film, which are dyed with iodine, etc., and stretched; wire-grid-type polarizers composed of many metal wires arranged in parallel; coated-type polarizers coated with a lyotropic liquid crystal or a dichromatic guest-host material; and multilayer thin-film-type polarizers. These polarizers may be reflective polarizers having a function of reflecting a polarized component not transmitted.

<Transparent Protective Plate>

The first transparent protective plate is disposed on one side of the polarizer, and the second transparent protective plate is disposed on the other side. At least one of the first transparent protective plate and the second transparent protective plate is the aforementioned anti-glare film of the present disclosure.

The polarizing plate of the present disclosure may be a polarizing plate in which one of the first transparent protective plate and the second transparent protective plate is the aforementioned anti-glare film of the present disclosure, or may be a polarizing plate in which both the first transparent protective plate and the second transparent protective plate are the aforementioned anti-glare films of the present disclosure.

As the transparent protective plate other than the anti-glare film of the present disclosure among the first transparent protective plate and the second transparent protective plate, general-purpose plastic films and glass can be used.

The polarizer and the transparent protective plate are preferably laminated via an adhesive. A general-purpose adhesive can be used as the adhesive, and a PVA-based adhesive is preferred.

[Surface Plate for Image Display Device]

A surface plate for an image display device of the present disclosure is a surface plate for an image display device, the surface plate comprising: a resin plate or a glass plate; and a protective film bonded to the resin plate or the glass plate, wherein the protective film is the aforementioned anti-glare film of the present disclosure, and a surface opposite to the uneven surface of the anti-glare film and the resin plate or the glass plate are disposed so as to face each other.

As the resin plate or the glass plate, resin plates or glass plates generally used as a surface plate of an image display device can be used.

To improve the strength, a thickness of the resin plate or the glass plate is preferably 10 μm or more. An upper limit of the thickness of the resin plate or the glass plate is typically 5000 μm or less. The upper limit of the thickness of the resin plate or the glass plate is preferably 1000 μm or less, more preferably 500 μm or less, and further preferably 100 μm or less for thinning.

Embodiments of a range of the thickness of the resin plate or the glass plate is 10 μm or more and 5000 μm or less, 10 μm or more and 1000 μm or less, 10 μm or more and 500 μm or less, and 10 μm or more and 100 μm or less.

[Image Display Panel]

An image display panel of the present disclosure is an image display panel comprising: a display element; and an optical film disposed on a light-emitting surface side of the display element, wherein the image display panel comprises the aforementioned anti-glare film of the preset disclosure as the optical film, and the anti-glare film is disposed so that a surface of the anti-glare film on the uneven surface side is disposed so as to face the opposite side to the display element (see FIG. 4).

In the image display panel, the anti-glare film of the present disclosure is preferably disposed on an outermost surface on a light-emitting surface side of a display element.

Examples of display elements include liquid crystal display elements, EL display elements (organic EL display elements and inorganic EL display elements), plasma display elements, and LED display elements such as micro LED display elements. These display elements may have a touch panel function inside the display element.

Examples of the liquid crystal display method of the liquid crystal display element includes an IPS method, a VA method, a multi-domain method, an OCB method, an STN method, and a TSTN method.

The image display panel of the present disclosure may be an image display panel with a touch panel having the touch panel between the display element and the anti-glare film.

The size of the image display panel is not particularly limited, but the maximum size is about 2 inches or more and 500 inches or less. The maximum size refers to the maximum length of any two points within the surface of the image display panel.

[Image Display Device]

The image display device of the present disclosure comprises the image display panel of the present disclosure.

The image display device of the present disclosure is not particularly limited as long as the image display device comprises the image display panel of the present disclosure. The image display device of the present disclosure preferably has: the image display panel of the present disclosure; a driving control part electrically connected to the image display panel; and a housing that houses these members.

When the display element is a liquid crystal display element, the image display device of the present disclosure requires a backlight. The backlight is disposed opposite to the light-emitting surface side of the liquid crystal display element.

The size of the image display device is not particularly limited, but the maximum size of the effective display region is about 2 inches or more and 500 inches or less.

The effective display region of an image display device is an area in which an image can be displayed. For example, when the image display device has a housing that surrounds the display element, the region inside the housing becomes the effective image region.

The maximum size of the effective image region refers to the maximum length of any two points within the effective image area when connected. For example, when the effective image region is rectangular, the diagonal line of the rectangle is the maximum size. When the effective image region is circular, the diameter of the circle is the maximum size.

The present disclosure includes the following <1> to <18<.

<1> An anti-glare film comprising an anti-glare layer, the anti-glare film having an uneven surface, wherein a 60°-specular glossiness measured from the uneven surface side is 30.0 or less, and a coefficient of variation of brightness is 0.0400 or less, (Measurement of the Coefficient of Variation of Brightness)

the anti-glare film is laminated with a surface opposite to the uneven surface of the anti-glare film onto an image display device having a display element having a pixel density of 424 ppi; an image of the image display device is displayed in green in a dark room, and the image is photographed with a CCD camera from the anti-glare film side to obtain an image data, wherein the CCD camera used has a pixel pitch of 5.5 μm×5.5 μm and the number of pixels of 16 million pixels, and a distance from a surface of the display element to an incident pupil of a camera lens contained in the CCD camera is 500 mm; from the obtained image data, a region α with 128×128 pixels is extracted; the region α is subdivided into regions each with 8×8 pixels to obtain 256 small regions; in each of the small regions, brightness of each pixel in each of the small regions is divided by an average brightness of all pixels in each of the small regions to obtain a corrected brightness; and a standard deviation of the corrected brightness in the 256 small regions is divided by an average value of the corrected brightness in the 256 small regions to calculate a coefficient of variation of the brightness.

<2> The anti-glare film according to <1>, wherein a 20°-specular glossiness measured from the uneven surface side is 6.0 or less.

<3> The anti-glare film according to <1> or <2>, wherein when a root mean square inclination of the uneven surface is defined as $\Delta q$ and a root mean square wavelength of the uneven surface is defined as $\lambda q$, $\Delta q$ is 0.250 μm/μm or more and $\lambda q$ is 17.000 μm or less.

<4> The anti-glare film according to any one of <1> to <3>, wherein when a root mean roughness of the uneven surface is defined as Rq, Rq is 0.300 μm or more.

<5> The anti-glare film according to any one of <1> to <4>, wherein a haze in accordance with JIS K7136: 2000 of 40% or more and 98% or less.

<6> The anti-glare film according to any one of <1> to <5>, wherein the anti-glare layer contains a binder resin and particles having an average particle size of 1.0 μm or more and 10.0 μm or less.

<7> The anti-glare film according to <6>, wherein when a thickness of the anti-glare layer is defined as T and an average particle size of the particles is defined as D, D/T is 0.20 or more and 0.96 or less.

<8> The anti-glare film according to <6> or <7>, wherein the particles are contained in an amount of 10 parts by mass or more and 200 parts by mass or less based on 100 parts by mass of the binder resin.

<9> The anti-glare film according to any one of <6> to <8>, comprising inorganic particles as the particles.

<10> The anti-glare film according to <9>, further comprising organic particles as the particles.

<11> The anti-glare film according to <10>, wherein the inorganic particles are irregularly shaped inorganic particles, and a mass ratio between the irregularly shaped inorganic particles and the organic particles is 5:1 to 1:1.

<12> The anti-glare film according to any one of <6> to <10>, wherein the anti-glare layer further comprises inorganic fine particles having an average particle size of 1 nm or more and 200 nm or less.

<13> The anti-glare film according to any one of <6> to <12>, wherein the binder resin comprises a cured product of an ionizing radiation-curable resin composition and a thermoplastic resin.

<14> The anti-glare film according to any one of <1> to <13>, further comprising an anti-reflection layer on the anti-glare layer, a surface of the anti-reflection layer being the uneven surface of the anti-glare film.

<15> A polarizing plate comprising:
- a polarizer;
- a first transparent protective plate disposed on one side of the polarizer; and
- a second transparent protective plate disposed on the other side of the polarizer, wherein
- at least one of the first transparent protective plate and the second transparent protective plate is the anti-glare film according to any one of <1> to <14>, and
- a surface opposite to the uneven surface of the anti-glare film and the polarizer are disposed so as to face each other.

<16> A surface plate for an image display device, the surface plate comprising: a resin plate or a glass plate; and a protective film bonded onto the resin plate or the glass plate, wherein the protective film is the anti-glare film according to any one of <1> to <14>, and a surface opposite to the uneven surface of the anti-glare film and the resin plate or the glass plate are disposed so as to face each other.

<17> An image display panel comprising: a display element; and an optical film disposed on a light-emitting surface side of the display element, wherein the image display panel comprises the anti-glare film according to any one of <1> to <14> as the optical film, and the anti-glare film is disposed so that a surface of the anti-glare film on the uneven surface side is disposed so as to face the opposite side to the display element.

<18> An image display device comprising the image display panel according to <17>, wherein the anti-glare film is disposed on an outermost surface.

EXAMPLES

Next, the present disclosure will be described in more detail with reference to Examples, but the present disclosure is not limited by these Examples. “Parts” and “%” are based on mass unless otherwise specified.

1. Measurement and Evaluation

The anti-glare films of Examples and Comparative Examples were measured and evaluated as follows. The atmosphere during each measurement and evaluation was set at a temperature of 23±5 °C, and a relative humidity of 40% or more and 65% or less. In addition, before starting each measurement and evaluation, the target sample was exposed to the atmosphere for 30 minutes or more and 60 minutes or less, and then the measurement and evaluation were performed. The results are shown in Table 1 or 2.

1-1. Measurement of Specular Glossiness

On a side of the transparent substrate of the anti-glare film of Examples and Comparative Examples, a black plate (Kuraray Co., Ltd., trade name “Comoglass DFA2CG 502K (black) Series”, total light transmittance 0%, thickness 2 mm, refractive index 1.49) was laminated via a transparent self-adhesive layer (Panac Co., Ltd.) with 25 μm in thickness, trade name “Panaclean PD-S1”, refractive index 1.49, to produce a sample (sample size: 10 cm in length×10 cm in width).

By using a gloss meter (MURAKAMI COLOR RESEARCH LABORATORY, trade name “GM-26PRO”), a 60°-specular glossiness and 20°-specular glossiness on the uneven surface side of the sample were measured. In order to stabilize the light source, the power switch of the apparatus was turned on in advance, and then the apparatus was allowed to stand for 15 minutes or more, standardization was performed with a standard plate attached to the apparatus, and then the sample was measured. For the standardization, the standard plate was set on the sample table so that the black glass surface of the standard plate was the measurement surface, and adjustment was performed with a span-adjusting knob so that the value was a value in accordance with the standard plate. Based on the description of the specification body, the measurement was performed at sixteen points on each sample, and an average value of the values at the sixteen points was determined as the 60°-specular glossiness and 20°-specular glossiness of each of Examples and Comparative Example.

1-2. Measurement of Coefficient of Variation of Brightness

As an image display device having a display element having a pixel density of 424 ppi, trade name “Xperia (Registered trademark) Z5 E6653” available from Sony Corporation was prepared. On the image display device, the anti-glare film of Examples and Comparative Examples was laminated with a surface on a side opposite to the uneven surface of the anti-glare film via a transparent adhesive medium (FUJICOPIAN CO., LTD., trade name “FIXFILM HGA2”). The transparent adhesive medium had a transparent adsorption layer, a transparent substrate with 50 μm in thickness, and a transparent self-adhesive layer in this order. In this time, the lamination was performed so that a side of the adsorption layer of the transparent adhesive medium was a side of the image display device, and a side of the self-adhesive layer of the transparent adhesive medium was a side opposite to the uneven surface of the anti-glare film.

Prepared as a CCD camera was a camera in which a camera lens (trade name of NIKON CORPORATION “AI AF Micro-Nikkor 60 mm f/2.8D”) was attached to a camera body (cooling CCD camera [trade name of BITRAN CORPORATION “BU-63M”, pixel pitch: 5.5 μm×5.5 μm, number of pixels: 16 million pixels, pixel number: 4896×3264]).

Then, the image display device laminated to the anti-glare film and the CCD camera were disposed so that a distance from a surface of the display element to an incident pupil of a camera lens contained in the CCD camera was 500 mm. An effective F-value of the camera lens was set to 36.4.

The CCD camera was adjusted so as to focus on the surface of the display element, and the image was photographed under a dark-room environment with the image display device with display in green. The "display in green" herein means display in a maximum monotone ((R,G,B)=(0,255,0)) among primary colors to constitute the display.

In photographing, the light exposure time was adjusted so that a tone of the obtained data did not exceed the upper and lower limits of the tone region to obtain the data.

From the image data obtained as above, a region α with an imaging element, 128×128 pixels, required for calculating the coefficient of variation of brightness was extracted. The region α was subdivided into regions each with 8×8 pixels to obtain 256 small regions. In each of the small regions, brightness of each pixel in each of the small regions was divided by an average brightness of all pixels in each of the small regions to obtain a corrected brightness. A standard deviation of the corrected brightness in the 256 small regions was divided by an average value of the corrected brightness in the 256 small regions to calculate a coefficient of variation of the brightness.

As described in the specification body, in the method for measuring the coefficient of variation of the brightness of the present disclosure, since the brightness of each pixel in each small region is divided by the average brightness of all the pixels in each small region, brightness unevenness specific to the display element can be corrected. In the method for measuring the coefficient of variation of the brightness of the present disclosure, since the standard deviation of the corrected brightness is divided by the average value of the corrected brightness, the absolute value of the brightness specific to the display element does not affect the results.

Based on the description of the specification body, the measurement was performed at sixteen points on each sample, and an average value of the values at the sixteen points was determined as the coefficient of variation of brightness of each of Examples and Comparative Examples.

1-3. Surface Shape Measurement

Using a white light interferometry microscope (Zygo Corporation, trade name "New View7300"), the sample produced in 1-1 was set on a measurement stage so as to be fixed and in close contact with the measurement stage, and then the surface shape of the anti-glare film was measured and analyzed under the following conditions. As a measurement software, trade name of Zygo Corporation "Microscope Stitching Application of MetroPro ver 9.0.10 (64-bit)" was used to perform measurement with automatically stitching a plurality of images. For analysis, Microscope Application of MetroPro ver 9.0.10 (64-bit) was used.

(Measurement Condition)

Objective lens: 50×
Image Zoom: 1×
Stitch Controls
Type: Column & Row
N Cols: 3
N Rows: 3
Overlap (%): 10
Measurement region: 611 μm×611 μm
Camera Res (resolution): 0.44 μm
Instrument: NewView 7000 Id 0 SN 073395
Acquisition Mode: Scan
Scan Length: 10 μm bipolar (2 sec)
Camera Mode: 496×496 70 Hz
Subtract Sys Err: Off
SysErr File: SysErr: dat
AGC: Off
Phase Res: High
Connection Order: Location
Discon Action: Filter
Min Mod (%): 0.01
Min Area Size: 7
Remove Fringes: Off
Number of Averages: 0
FDA Noise Threshold: 10
Scan Length: 10 um bipolar (3 sec)
Extended Scan Length: 1000 μm
FDA Res: High 2G (Analysis Condition)

Removed: None
Data Fill: On
Data Fill Max: 10000
Filter: High Pass
Filter Type: Gauss Spline
Filter Window Size: 3
Filter Trim: Off
Filter Low wavelength: 800 μm
Min Area Size: 0
Remove spikes: On
Spike Height (xRMS): 2.5

"Low wavelength" corresponds to "cutoff value λc" in the roughness parameter.

The "rms" was displayed on the Surface Map screen, and the value was specified as "Rq" of the measurement region. The "rms" was displayed on the Slope Mag Map screen, and the value was specified as "Δq" of the measurement region. The values of Rq and Δq were substituted for the formula (A) to calculate "λq".

1-4. Total Light Transmittance (Tt) and Haze (Hz)

The anti-glare films of Examples and Comparative Examples were cut into pieces of 10 cm squares. The cutting site was selected from random sites after visually confirming that there were no abnormal points such as dust and scratches. The total light transmittance of JIS K7361-1:1997 and the haze of JIS K7136:2000 of each sample were measured using a haze meter (HM-150, manufactured by Murakami Color Research Laboratory Co., Ltd.).

In order to stabilize the light source, the power switch of the apparatus was turned on in advance, and then the apparatus was allowed to stand for 15 minutes or more, then calibration was performed without setting anything in the inlet opening (position at which the measurement sample was to be set), and then a measurement sample was set in the inlet opening and measurement was performed. The light incident surface in the measurement was on the side of the transparent substrate.

1-5. Anti-Glare Properties 1 (Anti-Glare Properties in Specular Reflection Direction)

The sample produced in 1-1 was placed on a horizontal table with a height of 70 cm so that the uneven surfaces faced upward, and reflection of illumination light on the uneven surfaces was evaluated in a bright-room environment from an angle in the specular reflection direction of the illumination light according to the following evaluation criteria. During the evaluation, the position of the sample with respect to the illumination was adjusted so that the incident angle of the light emitted from the center of the illumination with respect to the sample B was 10 degrees. A Hf32 type straight tube three-wavelength neutral white fluorescent lamp was used as illumination, and the position of the illumination was 2 m above the horizontal table in the vertical direction. The evaluation was carried out in a range where the illuminance on the uneven surface of the sample was 500 lux or more and 1000 lux or less. The position of the eyes of observers was about 160 cm from the floor. A number of the observers was 20 selected from healthy people in their thirties with visual acuity of 0.7 or better.

<Evaluation Criteria>

- A: Sixteen or more people answered that outline of illumination and position of illumination were absolutely not visible.
- A-: Eleven or more and fifteen or less people answered that outline of illumination and position of illumination were absolutely not visible.
- B: Ten or less people answered that outline of illumination and position of illumination were absolutely not visible. In addition, among the people not making such an answer, a proportion of people who answered that outline of illumination and position of illumination were vaguely visible was less than the half.
- C: Ten or less people answered that outline of illumination and position of illumination were absolutely not visible. In addition, among the people not making such an answer, a proportion of people who answered that outline of illumination and position of illumination were vaguely visible was the half or more.

1-6. Anti-Glare Properties 2 (Anti-Glare Properties at Various Angles)

The sample produced in 1-1 was held with both hands, and the reflection of the illumination light on the uneven surface was evaluated in the same manner as in 1-5 except that the evaluation was performed while changing the height and angle of the sample. The change of the angle described above was performed within a range in which the incident angle of the light emitted from the center of the illumination with respect to the sample was 10 degrees or more and 70 degrees or less.

1-7. Sparkle

As an image display device having a display element having a pixel density of 424 ppi, trade name "Xperia (Registered trademark) Z5 E6653" available from Sony Corporation was prepared. On the image display device, the anti-glare film of Examples and Comparative Examples was laminated with a surface on a side opposite to the uneven surface of the anti-glare film via a transparent self-adhesive film (FUJICOPIAN CO., LTD., trade name "FIXFILM HGA2"). The transparent self-adhesive film had an adsorption layer, a substrate with 50 μm in thickness, and a tacky layer in this order. In this time, the lamination was performed so that a side of the adsorption layer of the transparent self-adhesive film was a side of the image display device, and a side of the tacky layer of the transparent self-adhesive film was a side opposite to the uneven surface of the anti-glare film.

The image display device laminated to the anti-glare film was placed on a horizontal table, and whether sparkle at the position where the anti-glare film was laminated was conspicuous or not was visually evaluated with the image display device in green from various angles above a linear distance with 50 cm from the anti-glare film. The evaluation environment was a bright-room environment (the illuminance on the anti-glare film was 500 lux to 1000 lux, illumination: an Hf32 type straight tube three-wavelength neutral white fluorescent lamp, the position of the illumination was 2 m above the horizontal table in the vertical direction).

A sample without sparkle feel was evaluated as three points, an undecided sample was evaluated as two points, and a sample with strong sparkle feel was evaluated as zero points, by 20 testers. An average point of the evaluation by the 20 people was calculated and ranked according to the following criteria. The 20 tester were each five people from twenties to fifties.

<Evaluation criteria>

- A: Average point was 2.5 or more.
- B: Average point was 2.0 or more and less than 2.5.
- C: Average point was 1.5 or more and less than 2.0.
- D: Average point was less than 1.5.

1-8. Transmitted Image Clearness

The anti-glare films of Examples and Comparative Examples were cut into pieces of 10 cm squares. The cutting site was selected from random sites after visually confirming that there were no abnormal points such as dust and scratches. The transmitted image clearness of the samples was measured by using an image clarity measuring device available from Suga Test Instruments Co., Ltd. (trade name: "ICM-IT") in accordance with JIS K7374:2007. A width of an optical comb was five of 0.125 mm, 0.25 mm, 0.5 mm, 1.0 mm, or 2.0 mm. The light incident surface for the measurement was the transparent substrate side. The values of $C_{0.125}$, $C_{0.25}$, $C_{0.5}$, $C_{1.0}$, and $C_{2.0}$ and the total value of $C_{0.125}$, $C_{0.5}$, $C_{1.0}$, and $C_{2.0}$ were shown in Table 2.

1-9. Scratch Resistance

The anti-glare film of Examples and Comparative Examples was laminated to a base of a Gakushin-type rubbing tester so that the uneven surface of the anti-glare film faced upward. A steel wool #0000 (available from Nippon Steel Wool Co., Ltd., trade name "Bonstar B-204") was set. The steel wool was contacted with the uneven surface, and reciprocated ten times at a moving speed of 100 mm/sec and a moving distance per reciprocation of 200 mm with applying a load. A contact area between the steel wool and the sample was set to 2 cm×2 cm.

Thereafter, each sample was visually observed under a fluorescent illumination to check a number of scratches. In this time, the illuminance on the anti-glare film was 800 lux or more and 1200 lux or less, and the observation distance was 30 cm. On each anti-glare film, a maximum load (g) per unit area when no scratch was observed after the test was determined. On each anti-glare film, the test was performed with n=2 to calculate an average of the maximum loads, and evaluated according to the following criteria. In Comparative Examples 1 and 2, which had the anti-glare properties evaluation of C, and in Comparative Example 3, which had the sparkle evaluation of D, the scratch resistance was not evaluated.

<Evaluation Criteria>

- A: The maximum load was 200 g or more.
- B: The maximum load was 150 g or more and less than 200 g.
- C: The maximum load was less than 150 g.

1-10. Jet-Black Appearance

The sample prepared in 1-1 was placed on a horizontal table with a height of 70 cm so that the uneven surface faced upward. The position of the sample with respect to the illumination was adjusted so that the light having the strongest emission angle among the light emitted from the illumination did not just barely enter the sample. By the above-described adjustment, the position of the sample with respect to the observer is arranged on the side farther from the observer than the position of the sample 1-5.

The sample was arranged at the position described above, and the degree of reflected scattered light was evaluated according to the following evaluation criteria. The line of sight of the observer was about 160 cm from the floor. Observers were 20 healthy people with visual acuity of 0.7 or better. For the 20 people, five people are selected from each age of twenties to fifties. In Comparative Examples 1 and 2, which had the anti-glare properties evaluation of C, and in Comparative Example 3, which had the sparkle evaluation of D, the jet-black appearance was not evaluated.

<Evaluation Criteria>

A: Fourteen or more people felt good jet-black appearance.

B: Seven or more and thirteen or less people felt good jet-black appearance.

C: Six or less people felt good jet-black appearance.

2. Production of Anti-Glare Film

Example 1

An anti-glare layer-coating liquid 1 having the following formulation was applied onto a transparent substrate (triacetyl cellulose resin film (TAC) of 80 μm in thickness, Fujifilm Corporation, TD80UL), dried at 70 °C and a wind velocity of 5 m/s for 30 seconds, and then irradiated with ultraviolet rays in a nitrogen gas atmosphere having an oxygen concentration of 200 ppm or less so that the integrated light quantity became 100 mJ/cm$^2$ to form an anti-glare layer, thereby obtaining an anti-glare film of Example 1. The thickness of the anti-glare layer was 5.0 μm. The surface on a side opposite to the uneven surface of the anti-glare film had an arithmetic mean roughness Ra of 0.012 μm.

The anti-glare layers of Examples 1 to 9 and Comparative Examples 1 to 3 were produced by the method (d1) in the specification body.

Example 2

An anti-glare film of Example 2 were obtained in the same manner as in Example 1, except that anti-glare layer-coating liquid 1 was changed to the following anti-glare layer-coating liquid 2, and the thickness of the anti-glare layer was changed to 6.5 μm.

[Examples 3, 6, 7, and 8], [Comparative Examples 1 to 3]

Anti-glare films of Examples 3, 6, 7, and 8 and Comparative Examples 1 to 3 were obtained in the same manner as in Example 1, except that the anti-glare layer-coating liquid 1 was changed to the following anti-glare layer-coating liquid 3 to 9.

Example 4

On the anti-glare layer of the anti-glare film of Example 1, an anti-reflection layer was formed by a sputtering method to obtain an anti-glare film of Example 4. The anti-reflection layer had a multilayer structure in which a low refractive index layer with 10 nm in film thickness composed of $SiO_2$, a high refractive index layer with 25 nm in film thickness composed of $Nb_2O_5$, a low refractive index layer with 35 nm in film thickness composed of $SiO_2$, a high refractive index layer with 40 nm in film thickness composed of $Nb_2O$, and a low refractive index layer with 104 nm in film thickness composed of $SiO_2$ were stacked in this order. The refractive indices of the high refractive index layer and the low refractive index layer were measured by the Becke method, and the refractive index of the high refractive index layer was 2.32, and the refractive index of the low refractive index layer was 1.45.

Example 5

On the anti-glare layer of the anti-glare film of the Example 2, a low refractive index layer-coating liquid 1 with the following formulation was applied, the coating was dried at 70 °C and a wind velocity of 5 m/s for 30 seconds, and then irradiated with ultraviolet rays in a nitrogen gas atmosphere (having an oxygen concentration of 200 ppm or less) so that the integrated light quantity became 100 mJ/cm$^2$ to form a low refractive index layer, thereby obtaining an anti-glare film of Example 5. The thickness of the low refractive index layer was 0.10 μm, and the refractive index was 1.32.

Example 9

An anti-glare film of Example 9 was obtained in the same manner as in Example 5, except that the anti-glare film of Example 8 was used instead of the anti-glare film of Example 2.

Example 10

An anti-glare layer-coating liquid 11 having the following formulation was applied onto a transparent substrate (thickness 80 μm, triacetyl cellulose resin film (TAC), Fujifilm Corporation, TD80UL), dried at 70 °C and a wind velocity of 5 m/s for 60 seconds, and then subjected to irradiation so that the integrated light quantity became 60 mJ/cm$^2$ to form an anti-glare layer. The anti-glare layer had a thickness of 8.0 μm. Then, the low refractive index layer-coating liquid 1 was applied on the anti-glare layer, dried at 70 °C and a wind velocity of 2 m/s for 30 seconds, and then irradiated with ultraviolet rays in a nitrogen gas atmosphere (an oxygen concentration of 200 ppm or less) so that the integrated light quantity became 100 mJ/cm$^2$ to form a low refractive index layer, thereby obtaining the anti-glare film of Example 11.

The anti-glare layers of Example 10 and Comparative Example 4 were produced by a phase-separation method of (d2) in the specification body.

Comparative Example 4

An anti-glare layer-coating liquid 10 having the following formulation was applied onto a transparent substrate (thickness 100 μm, polyethylene terephthalate resin film (PET), Mitsubishi Chemical Corporation, DIAFOIL), dried at 80 °C and a wind velocity of 5 m/s for 60 seconds, and then subjected to irradiation so that the integrated light quantity became 100 mJ/cm$^2$ to form an anti-glare layer, thereby obtaining an anti-glare film of Comparative Example 4. The anti-glare layer had a thickness of 9.0 μm. A surface opposite to the uneven surface of the anti-glare film had an arithmetic mean roughness Ra of 0.014 μm.

Comparative Example 5

An anti-glare film of Comparative Example 5 was obtained in the same manner as in Comparative Example 4, except that the anti-glare layer-coating liquid was changed to an anti-glare layer-coating liquid 12 having the following formulation, and the thickness of the anti-glare layer was changed to 7.0 μm.

Comparative Example 6

An anti-glare film of Comparative Example 6 was obtained in the same manner as in Comparative Example 4, except that the anti-glare layer-coating liquid was changed to an anti-glare layer-coating liquid 13 having the following formulation.

Comparative Example 7

An anti-glare film of Comparative Example 7 was obtained in the same manner as in Comparative Example 4, except that the anti-glare layer-coating liquid was changed to an anti-glare layer-coating liquid 14 having the following formulation, and the thickness of the anti-glare layer was changed to 6.0 μm.

<Anti-Glare Layer-Coating Liquid 1>

Pentaerythritol triacrylate 80 parts
(Nippon Kayaku Co., Ltd., trade name: KAYARAD-PET-30)
Urethane acrylate oligomer 20 parts
(DIC Corporation, trade name: V-4000BA)
Silica particle 25 parts
(average particle size: 4.1 μm)
(available from FUJI SILYSIA CHEMICAL LTD., gel-method irregularly shaped silica)
Organic particles 10 parts
(Sekisui Kasei Co., Ltd., spherical polyacrylic-styrene copolymer)
(average particle size 2.0 μm, refractive index 1 0.515)
(ratio of particles with a particle size of 1.8 to 2.2 μm is 90% or more)
Photopolymerization initiator 3 parts
(IGM Resins B.V., trade name: Omnirad184)
Photopolymerization initiator 2 parts
(IGM Resins B.V., trade name: Omnirad907)
Silicone leveling agent 0.2 parts
(Momentive Performance Materials, trade name: TSF4460)
Solvent (toluene) 233.0 parts
Solvent (cyclohexanone) 27.1 parts <Anti-Glare Layer-Coating Liquid 2>

A coating liquid having a composition similar to that of the anti-glare layer-coating liquid 1, except that the organic particles of the anti-glare layer-coating liquid 1 were changed to organic particles "average particle size 3.5 μm, refractive index 1.515 (Sekisui Kasei Co., Ltd., spherical polyacrylic-styrene copolymer, ratio of particles with a particle size of 3.3 to 3.7 μm was 90% or more)", the silica particles were changed to silica particles "average particle size 6.0 μm (available from FUJI SILYSIA CHEMICAL LTD., gel-method irregularly shaped silica)", and the amount of the added silica particles was changed from 25 parts to 20 parts.

<Anti-Glare Layer-Coating Liquid 3>

A coating liquid having a composition similar to that of the anti-glare layer-coating liquid 1, except that the amount of the added organic particles was changed from 10 parts to 0 parts, and the amount of the added silica particles was changed from 25 parts to 30 parts.

<Anti-Glare Layer-Coating Liquid 4>

Pentaerythritol triacrylate 51.4 parts
(Nippon Kayaku Co., Ltd., trade name: KAYARAD-PET-30)
Urethane acrylate oligomer 23.7 parts
(DIC Corporation, trade name: V-4000BA)
Thermoplastic resin 24.9 parts
(Acryl polymer, MITSUBISHI RAYON CO., LTD., molecular weight 75,000)
Organic particles 59.3 parts
(Sekisui Kasei Co., Ltd., spherical polyacrylic-styrene copolymer)
(average particle size 2.5 μm, refractive index 1.515)
(ratio of particles with a particle size of 2.3 to 2.7 μm is 90% or more)
Inorganic fine particle dispersion 215 parts
(Nissan Chemical Industries, Ltd., silica having a reactive functional group introduced on its surface, solvent: MIBK, solid content: 35.5%)
(average particle size 12 nm)
(active ingredient of inorganic fine particles: 76.3 parts)
Photopolymerization initiator 1.5 parts
(IGM Resins B.V., trade name: Omnirad184)
Photopolymerization initiator 4.8 parts
(IGM Resins B.V., trade name: Omnirad907)
Silicone leveling agent 0.2 parts
(Momentive Performance Materials, trade name: TSF4460)
Solvent (toluene) 317.6 parts
Solvent (cyclohexanone) 15.0 parts
Solvent (methyl isobutyl ketone) 121.1 parts <Anti-Glare Layer-Coating Liquid 5>

A coating liquid having a composition similar to that of the anti-glare layer-coating liquid 4, except that the amount of the added organic particles was changed from 59.3 parts to 43.3 parts, and the amount of the added silica particles in the inorganic fine particle dispersion was changed from 215 parts to 182 parts.

<Anti-Glare Layer-Coating Liquid 6>

A coating liquid having a composition similar to that of the anti-glare layer-coating liquid 1, except that the amount of the added silica particles was changed from 25 parts to 20 parts.

<Anti-Glare Layer-Coating Liquid 7>

Pentaerythritol triacrylate 65 parts
(Nippon Kayaku Co., Ltd., trade name: KAYARAD-PET-30)
Urethane acrylate oligomer 35 parts
(DIC Corporation, trade name: V-4000BA)
Organic particles 14 parts
(Sekisui Kasei Co., Ltd., spherical polyacrylic-styrene copolymer)
(average particle size 3.5 μm, refractive index 1.550)
Silica particle 6 parts
(average particle size: 12 nm)
(Nippon Aerosil Co., Ltd., fumed silica)
Photopolymerization initiator 5 parts
(IGM Resins B.V., trade name: Omnirad184)
Silicone leveling agent 0.025 parts
(Momentive Performance Materials, trade name: TSF4460)
Solvent (toluene) 100 parts
Solvent (cyclohexanone) 20 parts
Solvent (isopropyl alcohol) 55 parts <Anti-Glare Layer-Coating Liquid 8>

Pentaerythritol triacrylate 100 parts (Nippon Kayaku Co., Ltd., trade name: KAYARAD-PET-30)

Silica particles 7 parts (average particle size: 4.1 μm)

(manufactured by Fuji Silysia Chemical Ltd., gel method irregularly shaped silica)

Photopolymerization initiator 5 parts (IGM Resins B.V., trade name: Omnirad184)

Silicone leveling agent 0.2 parts (Momentive Performance Materials, trade name: TSF4460)

Solvent (toluene) 150 parts

Solvent (MIBK) 35 parts

Solvent (ethyl acetate) 5.2 parts

<Anti-Glare Layer-Coating Liquid 9>

A coating liquid having a composition similar to that of the anti-glare layer-coating liquid 8, except that the amount of the added silica particles in the anti-glare layer-coating liquid 8 was changed from 7 parts to 14 parts.

<Anti-Glare Layer-Coating Liquid 10>

Acrylic polymer 15.0 parts (DAICEL-ALLNEX LTD., trade name: Cyclomer-P)

Cellulose acetate propionate 3 parts (Eastman Chemical Company, trade name: CAP-482-20)

Nano-silica-containing acrylic ultraviolet-curable compound 150 parts (Momentive Performance Materials, trade name: UVHC7800G)

Silicone acrylate 1 part (DAICEL-ALLNEX LTD., trade name: EB1360)

Photopolymerization initiator 1 part (IGM Resins B.V., trade name: Omnirad184)

Photopolymerization initiator 1 part (IGM Resins B.V., trade name: Omnirad907)

Solvent (methyl ethyl ketone) 101 parts

Solvent (1-butanol) 24 parts

<Anti-Glare Layer-Coating Liquid 11>

Isobornyl-methacrylate-containing oligomer 5.0 parts

Pentaerythritol triacrylate 30 parts

Nano-silica-containing acrylic ultraviolet-curable compound 120 parts (Momentive Performance Materials, trade name: UVHC7800G)

Photopolymerization initiator 1 part (IGM Resins B.V., trade name: Omnirad184)

Photopolymerization initiator 1 part (IGM Resins B.V., trade name: Omnirad907)

Solvent (isopropanol) 115 parts

Solvent (MIBK) 40 parts

<Anti-Glare Layer-Coating Liquid 12>

Acrylic polymer 12.5 parts (DAICEL-ALLNEX LTD., trade name: Cyclomer-P)

Cellulose acetate propionate 5.5 parts (Eastman Chemical Company, trade name: CAP-482-20)

Nano-silica-containing acrylic ultraviolet-curable compound 149 parts (Momentive Performance Materials, trade name: UVHC7800G)

Fluorine-based compound 0.1 part (NEOS COMPANY LIMITED, trade name. Ftergent 602A)

Photopolymerization initiator 1 part (IGM Resins B.V., trade name: Omnirad184)

Photopolymerization initiator 1 part (IGM Resins B.V., trade name: Omnirad907)

Solvent (methyl ethyl ketone) 129 parts

Solvent (1-butanol) 24 parts

Solvent (1-methoxy-2-propanol) 13 parts

<Anti-Glare Layer-Coating Liquid 13>

Acrylic polymer 12.5 parts (DAICEL-ALLNEX LTD., trade name: Cyclomer-P)

Cellulose acetate propionate 4 parts (Eastman Chemical Company, trade name: CAP-482-20)

Nano-silica-containing acrylic ultraviolet-curable compound 210 parts (JGC Catalysts and Chemicals Ltd., HP-1004)

Silicone acrylate 1 part (DAICEL-ALLNEX LTD., trade name: EB1360)

Photopolymerization initiator 1 part (IGM Resins B.V., trade name: Omnirad184)

Photopolymerization initiator 1 part (IGM Resins B.V., trade name: Omnirad907)

Solvent (methyl ethyl ketone) 31 parts

Solvent (1-butanol) 24 parts

Solvent (1-methoxy-2-propanol) 12 parts

<Anti-Glare Layer-Coating Liquid 14>

Acrylic polymer 47.5 parts (DAICEL-ALLNEX LTD., trade name: Cyclomer-P)

Cellulose acetate propionate 1.5 parts (Eastman Chemical Company, trade name: CAP-482-20)

Urethane acrylate 79.5 parts (SHIN-NAKAMURA CHEMICAL Co., Ltd., trade name: U-15HA)

Photopolymerization initiator 1 part (IGM Resins B.V., trade name: Omnirad184)

Photopolymerization initiator 1 part (IGM Resins B.V., trade name: Omnirad907)

Solvent (methyl ethyl ketone) 175 parts

Solvent (1-butanol) 28 parts

Solvent (1-methoxy-2-propanol) 2 parts

<Low Refractive Index Layer-Coating Liquid 1>

Polyfunctional acrylate ester composition 100 parts by mass (available from DKS Co. Ltd., trade name "NEW FRONTIER MF-001")

Hollow silica particles 200 parts by mass (average primary particle size 75 nm, particles surface-treated with a silane coupling agent having a methacryloyl group)

Solid silica particles 110 parts by mass (average primary particle size 12.5 nm, particles surface-treated with a silane coupling agent having a methacryloyl group)

Silicone leveling agent 13 parts by mass (Shin-Etsu Chemical Co., Ltd., trade name "X-22-164E")

Photopolymerization initiator 4.3 parts by mass (IGM Resins B.V., trade name "Omnirad127")

Solvent 14,867 parts by mass (mixed solvent of methyl isobutyl ketone and 1-methoxy-2-propyl acetate, mass ratio=68/32)

TABLE 1

| | Number of anti-glare layer-coating liquid | Presence/absence of anti-reflection layer | Specular glossiness 20° | Specular glossiness 60° | Coefficient of variation of brightness | Surface shape Δq [μm/μm] | Surface shape λq [μm] | Surface shape Rq [μm] |
|---|---|---|---|---|---|---|---|---|
| Example 1 | 1 | absence | 0.3 | 4.5 | 0.0212 | 0.594 | 8.781 | 0.587 |
| Example 2 | 2 | absence | 0.3 | 4.6 | 0.0268 | 0.626 | 13.371 | 0.945 |
| Example 3 | 3 | absence | 0.3 | 3.4 | 0.0248 | 0.508 | 12.326 | 0.705 |
| Example 4 | 1 | presence | 0.1 | 2.2 | 0.0207 | 0.485 | 7.695 | 0.420 |
| Example 5 | 2 | presence | 0.2 | 2.9 | 0.0263 | 0.588 | 13.041 | 0.863 |
| Example 6 | 4 | absence | 0.2 | 2.6 | 0.0178 | 0.512 | 7.862 | 0.453 |
| Example 7 | 5 | absence | 0.5 | 7.1 | 0.0275 | 0.391 | 15.925 | 0.701 |
| Example 8 | 6 | absence | 0.4 | 7.5 | 0.0332 | 0.320 | 16.022 | 0.577 |
| Example 9 | 6 | presence | 0.3 | 6.5 | 0.0384 | 0.297 | 16.514 | 0.552 |
| Example 10 | 11 | presence | 0.4 | 5.3 | 0.0334 | 0.351 | 15.336 | 0.531 |
| Comparative Example 1 | 7 | absence | 9.7 | 49.1 | 0.0431 | 0.105 | 17.517 | 0.207 |
| Comparative Example 2 | 8 | absence | 6.3 | 36.2 | 0.0678 | 0.202 | 21.554 | 0.490 |
| Comparative Example 3 | 9 | absence | 3.3 | 25.4 | 0.0490 | 0.2620 | 19.026 | 0.561 |
| comparative Example 4 | 10 | absence | 0.3 | 7.8 | 0.0413 | 0.415 | 17.835 | 0.833 |
| Comparative Example 5 | 12 | absence | 0.1 | 1 | 0.0389 | 0.501 | 16.99 | 0.958 |
| Comparative Example 6 | 13 | absence | 0.2 | 2.1 | 0.0385 | 0.453 | 16.791 | 0.856 |
| Comparative Example 7 | 14 | absence | 0.2 | 4.1 | 0.0429 | 0.376 | 18.977 | 0.812 |

| | Tt [%] | Hz [%] | Anti-glare properties 1 | Anti-glare properties 2 | Sparkle | Scratch resistance | Jet-black appearance |
|---|---|---|---|---|---|---|---|
| Example 1 | 91.1 | 68.9 | A | A | A | A | A |
| Example 2 | 90.6 | 71.4 | A | A | A | C | A |
| Example 3 | 90.4 | 76.5 | A | A | A | A | A |
| Example 4 | 94.7 | 70.6 | A | A | A | A | A |
| Example 5 | 92.8 | 69.3 | A | A | A | C | A |
| Example 6 | 91.7 | 78.1 | A | A | A | A | A |
| Example 7 | 90.7 | 60.9 | A | A− | A | A | A |
| Example 8 | 90.7 | 52.6 | A− | A− | B | A | A |
| Example 9 | 92.3 | 50.0 | A− | A− | B | A | A |
| Example 10 | 92.2 | 46.1 | A− | A− | B | A | A |
| Comparative Example 1 | 90.7 | 24.7 | C | C | C | — | — |
| Comparative Example 2 | 91.1 | 12.7 | C | C | D | — | — |
| Comparative Example 3 | 91.1 | 23.5 | B | B | D | — | — |
| comparative Example 4 | 90.0 | 67.9 | A | A | C | C | B |
| Comparative Example 5 | 87.2 | 92.8 | A | A | B | C | B |
| Comparative Example 6 | 89.8 | 88.1 | A | A | B | C | B |
| Comparative Example 7 | 90.2 | 71.9 | A | A | C | C | B |

TABLE 2

| | Transmission clearness (%) $C_{0.125}$ | $C_{0.25}$ | $C_{0.5}$ | $C_{1.0}$ | $C_{2.0}$ | Total of $C_{0.125}$, $C_{0.5}$, $C_{1.0}$, and $C_{2.0}$ |
|---|---|---|---|---|---|---|
| Example 1 | 11.8 | 10.9 | 11.2 | 10.4 | 17.8 | 51.2 |
| Example 2 | 3.4 | 2.1 | 2.2 | 2.9 | 8.3 | 16.8 |
| Example 3 | 2.8 | 2.1 | 2.2 | 3.3 | 7.6 | 15.9 |
| Example 4 | 12.8 | 12.5 | 13.0 | 13.0 | 18.7 | 57.5 |
| Example 5 | 3.0 | 1.8 | 2.2 | 3.7 | 7.8 | 16.7 |
| Example 6 | 18.5 | 18.1 | 18.4 | 18.8 | 22.8 | 78.5 |

TABLE 2-continued

| | Transmission clearness (%) $C_{0.125}$ | $C_{0.25}$ | $C_{0.5}$ | $C_{1.0}$ | $C_{2.0}$ | Total of $C_{0.125}$, $C_{0.5}$, $C_{1.0}$, and $C_{2.0}$ |
|---|---|---|---|---|---|---|
| Example 7 | 22.3 | 21.8 | 22.4 | 23.1 | 25.6 | 93.4 |
| Example 8 | 11.5 | 10.8 | 11.6 | 11.0 | 17.2 | 51.3 |
| Example 9 | 12.1 | 11.2 | 11.9 | 11.3 | 17.8 | 53.1 |
| Example 10 | 14.2 | 11.3 | 11.7 | 12.1 | 16.4 | 65.7 |
| Comparative Example 1 | 39.7 | 39.3 | 38.9 | 43.0 | 56.0 | 177.6 |

TABLE 2-continued

| | Transmission clearness (%) | | | | | Total of $C_{0.125}$, $C_{0.5}$, $C_{1.0}$, and |
|---|---|---|---|---|---|---|
| | $C_{0.125}$ | $C_{0.25}$ | $C_{0.5}$ | $C_{1.0}$ | $C_{2.0}$ | $C_{2.0}$ |
| Comparative Example 2 | 4.1 | 3.4 | 4.1 | 6.7 | 30.9 | 45.8 |
| Comparative Example 3 | 3.0 | 2.2 | 1.7 | 3.4 | 16.5 | 24.6 |
| Comparative Example 4 | 9.4 | 8.0 | 8.1 | 8.4 | 14.4 | 40.3 |

From the results in Table 1, it can be confirmed that the anti-glare film of Examples has excellent anti-glare properties, and capable of suppressing sparkle.

REFERENCE SIGNS LIST

10: transparent substrate
20: anti-glare layer
21: binder resin
22: particles
100: anti-glare film
110: display element
120: image display panel
200: transparent adhesive medium
31: camera body
32: lens
300: CCD camera
500: fixing tool
600: horizontal table
700: observer

The invention claimed is:

1. An anti-glare film comprising an anti-glare layer, the anti-glare film having an uneven surface, wherein a 60°-specular glossiness measured from the uneven surface side is 30.0 or less, and a coefficient of variation of brightness is 0.0400 or less, and when a root mean roughness of the uneven surface is defined as Rq, Rq is 0.300 μm or more and 0.800 μm or less, (measurement of the coefficient of variation of brightness)

the anti-glare film is laminated with a surface opposite to the uneven surface of the anti-glare film onto an image display device having a display element having a pixel density of 424 ppi;

an image of the image display device is displayed in green in a dark room, and the image is photographed with a CCD camera from the anti-glare film side to obtain an image data, wherein the CCD camera used has a pixel pitch of 5.5 μm×5.5 μm and the number of pixels of 16 million pixels, and a distance from a surface of the display element to an incident pupil of a camera lens contained in the CCD camera is 500 mm;

from the obtained image data, a region α with 128×128 pixels is extracted;

the region α is subdivided into regions each with 8×8 pixels to obtain 256 small regions;

in each of the small regions, brightness of each pixel in each of the small regions is divided by an average brightness of all pixels in each of the small regions to obtain corrected brightnesses; and a standard deviation of the corrected brightness in the 256 small regions is divided by an average value of the corrected brightness in the 256 small regions to calculate a coefficient of variation of the brightness.

2. The anti-glare film according to claim 1, wherein a 20°-specular glossiness measured from the uneven surface side is 6.0 or less.

3. The anti-glare film according to claim 1, wherein when a root mean square inclination of the uneven surface is defined as Δq and a root mean square wavelength of the uneven surface is defined as λq, Δq is 0.275 μm or more and λq is 16.520 μm or less.

4. The anti-glare film according to claim 1, having a haze of 40% or more and 98% or less according to JIS K7136: 2000.

5. The anti-glare film according to claim 1, wherein the anti-glare layer contains a binder resin and particles having an average particle size of 1.0 μm or more and 10.0 μm or less.

6. The anti-glare film according to claim 5, wherein when a thickness of the anti-glare layer is defined as T and an average particle size of the particles is defined as D, D/T is 0.20 or more and 0.96 or less.

7. The anti-glare film according to claim 5, wherein the particles are contained in an amount of 30 parts by mass or more and 200 parts by mass or less based on 100 parts by mass of the binder resin.

8. The anti-glare film according to claim 5, comprising inorganic particles as the particles.

9. The anti-glare film according to claim 8, further comprising organic particles as the particles.

10. The anti-glare film according to claim 9, wherein an average particle size of the inorganic particles and an average particle size of the organic particles are different.

11. The anti-glare film according to claim 9, wherein the inorganic particles are irregularly shaped inorganic particles, and a mass ratio between the irregularly shaped inorganic particles and the organic particles is 5:1 to 1:1.

12. The anti-glare film according to claim 5, wherein the anti-glare layer further comprises inorganic fine particles having an average particle size of 1 nm or more and 200 nm or less.

13. The anti-glare film according to claim 5, wherein the binder resin comprises a cured product of an ionizing radiation-curable resin composition and a thermoplastic resin.

14. The anti-glare film according to claim 5, comprising irregularly shaped inorganic particles as the particles.

15. The anti-glare film according to claim 1, further comprising an anti-reflection layer on the anti-glare layer, a surface of the anti-reflection layer being the uneven surface of the anti-glare film.

16. A polarizing plate comprising:

a polarizer;

a first transparent protective plate disposed on one side of the polarizer; and a second transparent protective plate disposed on the other side of the polarizer, wherein at least one of the first transparent protective plate and the second transparent protective plate is the anti-glare film according to claim 1, and a surface opposite to the uneven surface of the anti-glare film and the polarizer are disposed so as to face each other.

17. A surface plate for an image display device, the surface plate comprising:

a resin plate or a glass plate; and a protective film bonded to the resin plate or the glass plate, wherein the protective film is the anti-glare film according to claim 1, and a surface opposite to the uneven surface of the anti-glare film and the resin plate or the glass plate are disposed so as to face each other.

18. An image display panel comprising:

display element; and an optical film disposed on a light-emitting surface side of the display element, wherein the image display panel comprises the anti-glare film according to claim 1 as the optical film, and the anti-glare film is disposed so that a surface of the anti-glare film on the uneven surface side is disposed so as to face the opposite side to the display element.

19. An image display device comprising the image display panel according to claim 18, wherein the anti-glare film is disposed on an outermost surface.

20. The anti-glare film according to claim 1, wherein the anti-glare layer contains a binder resin and irregularly shaped inorganic particles.

* * * * *